United States Patent
Alvarado

(10) Patent No.: US 12,472,054 B2
(45) Date of Patent: Nov. 18, 2025

(54) INDUCTIVE MATRIX FOR FUNCTIONAL OCULAR SURFACE RECONSTRUCTION

(71) Applicant: Carlos A Alvarado, Colonia el Zompopero (GT)

(72) Inventor: Carlos A Alvarado, Colonia el Zompopero (GT)

( * ) Notice: Subject to any disclaimer, the term of this patent is extended or adjusted under 35 U.S.C. 154(b) by 0 days.

(21) Appl. No.: 18/729,799

(22) PCT Filed: Jan. 27, 2022

(86) PCT No.: PCT/IB2022/050694
§ 371 (c)(1),
(2) Date: Jul. 17, 2024

(87) PCT Pub. No.: WO2023/144580
PCT Pub. Date: Aug. 3, 2023

(65) Prior Publication Data
US 2025/0161023 A1 May 22, 2025

(51) Int. Cl.
*A61F 2/14* (2006.01)
*A61L 27/36* (2006.01)

(52) U.S. Cl.
CPC .......... *A61F 2/142* (2013.01); *A61L 27/3604* (2013.01); *A61L 2430/16* (2013.01)

(58) Field of Classification Search
CPC ........ A61F 2/142; A61F 2/1451; A61F 9/007; A61L 27/3604; A61L 2430/16; A61L 27/3633
See application file for complete search history.

(56) References Cited

U.S. PATENT DOCUMENTS

| 10,687,934 B2* | 6/2020 | Alvarado | ................ A61F 2/142 |
| 2017/0080127 A1 | 3/2017 | Alvarado | |
| 2023/0120340 A1* | 4/2023 | Elisseeff | ................ A61K 9/16 424/499 |

FOREIGN PATENT DOCUMENTS

| WO | 2018007849 A1 | 1/2018 |
| WO | 2022006076 A1 | 1/2022 |

OTHER PUBLICATIONS

Witt Joana et al . . . "Decellularised conjunctiva for ocular surface reconstruction". Acta Biomaterialia (Dec. 8, 2017) vol. 67, pp. 259-269, DOI 10.1016/j.actbio.2017.11.054.

* cited by examiner

*Primary Examiner* — Sarah W Aleman
*Assistant Examiner* — Rebecca Lynee Zimmerman
(74) *Attorney, Agent, or Firm* — Nath, Goldberg & Meyer; Joshua B. Goldberg

(57) ABSTRACT

A new method is provided that precisely harmonizes the structural and functional biological processes that lead to the optimal reconstruction of ocular surface disorders. The method consists of the administration of a trilaminar (3D) material, which comprises the mucosa, the basement membrane, and the submucosa of the porcine esophagus in a stabilized conformation of integrated layers, which accurately imitates ocular structures, whose mechanical properties, biocompatibility, and integration into the host's tissues, facilitate the structural and functional restoration of lost or damaged ocular tissues. Through the mimesis of the spatial microenvironments generated by their structure and their functional conjugation with the signals of the host's extracellular matrix, the reconstruction of the neo-tissue is successfully guided.

4 Claims, 1 Drawing Sheet

INDUCTIVE MATRIX FOR FUNCTIONAL OCULAR SURFACE RECONSTRUCTION

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A "SEQUENCE LISTING

Not Applicable

STATEMENT REGARDING PRIOR DISCLOSURES BY THE INVENTOR OR A JOINT INVENTOR

Not Applicable

FIELD OF THE INVENTION

The invention relates to the method of using materials as a transplant on the ocular surface and to restructuring and absorbable materials for such use.

BACKGROUND AND SUMMARY OF THE INVENTION

The ocular surface is an extremely sensitive and dynamic structure, the health of which is crucial for the optimal functioning of the eye.

Any mechanical, chemical, or endogenous factor aggression possibly results in structural-functional dysfunction.

The understanding of the problem gave way to the exhaustive review of the literature and patents to determine the advances and limitations, to propose other approaches and provide new solutions, being necessary to start with relevant aspects of the structures (anatomical and histological), the functions and interrelationships superficial and deep structures of the eye, listed and summarized below.

In the detailed examination of the ocular structures, Gipson I K (2007) specifies that the "Ocular surface system" is constituted by the surface and the glandular epithelium of the cornea, the conjunctiva, the lacrimal gland, the accessory lacrimal glands, and the gland of Meibomian, and its apical (tears) and basal (connective tissue) matrices.

The academic explains that in this system, all the components are functionally linked by the continuity of the epithelia, by innervation and by the endocrine, vascular and immune systems.

The researcher also highlights the importance of the tear film (multilayer fluid) that lubricates and keeps the ocular surface moist, nourishes and protects it from microbial infections.

Said author highlights that lipid make up one of the layers of said film, originated in the Meibomian glands, and that the aqueous fraction of another of the layers is produced by the lacrimal gland (with residual amounts derived from the conjunctival epithelium) and a glycocalyx basal composed of mucins.

This researcher highlights that the superficial lipid layer limits undesirable losses caused by evaporation, which ensures a uniform surface that minimizes scattering and allows precise refraction of light.[1]

Conjunctiva

Studies on the structure and function of the conjunctiva, formed by the epithelium and the stroma (substantia propria) by Weisenthal R W, et al (2013) when specifying the locations of the conjunctival epithelium, describe three different locations: palpebral, bulbar and forniceal, with sparse cell layers thick.

They mention that this epithelium, according to the location described, consists of different types of cells: stratified cuboidal cells are found on the tarsus, columnar cells are found in the fornices, and squamous cells are found in the bulbar conjunctiva.

Regarding the stroma, they point out that it is composed of loose, vascularized connective tissue, rich in elastic fibers, and a significant number of lymphocytes, which actively participate in the immune response of the ocular surface.[2]

Referring to the structure and functionality of the conjunctival epithelium, the group of Fernández, A., (2008) indicates that the corneal and conjunctival epithelia are continuous and make up the ocular surface, both made up of a keratinized non-stratified squamous epithelium, with the difference of that the conjunctival epithelium has mucin-secreting goblet cells interspersed with epithelial cells, which maintain the lacrimal layer of the ocular surface.[3]

In Copeland R. A. and Afshari N. A. (2013) describe the distribution, properties, morphology, and composition of the conjunctiva, which covers the ocular surface from the limbus to the mucocutaneous junction.

In the distribution they point out that the part that covers the sclera is known as the bulbar conjunctiva, while the palpebral conjunctiva covers the posterior surface of the eyelids.

In their composition, they report that the superficial layer of the conjunctiva is composed of non-keratinizing stratified squamous epithelium with numerous goblet cells, columnar in the forniceal part and cuboidal in the area attached to the tarsus, where the epithelial cells are packed in two to five layers.

Concerning morphology, these authors report that the number of layers of conjunctival epithelial cells changes, with the presence of six to nine layers of stratified squamous epithelium in the bulbar conjunctiva.

Regarding the conjunctival stroma (substantia propria), they define it as a thin and vascularized layer that encloses scattered lacrimal glands (depending on the anatomical location), lymphatics, plasma cells, macrophages, and mast cells.[4]

Regarding conjunctival epithelial tissues, studies by Rosellini A, et. al., (2007) point out that conjunctival stem cells can differentiate into mucin-producing goblet cells or epithelial cells and suggest that these arise from the fornical niche (cul-de-sac), whose presence is essential for the renewal of the conjunctival epithelium.[5]

The group of Tsai (2015) also highlights that the conjunctival epithelium continues with the cornea in the limbus, and that this site is the main corneal stem cell niche for the regeneration of epithelial cells.[6]

The properties of the conjunctiva were reviewed by the Qi H group, (2010), who highlight that its wide vascularization allows the correct flow of nutrients and liquids and point out the difficulty of specifying the source of conjunctival stem cells.

These authors acknowledge that these stem cells reside in the fornical niche (cul-de-sac) and that they can differentiate into mucin-producing goblet cells or epithelial cells, evidenced in clonal culture assays.[7]

Cornea

A detailed examination of the histological composition of the ocular surface by Sangwan, V. S. (2001) refer to the fact that the cornea, the conjunctiva, and the intermediate area, known as the limbus, are covered by a stratified, squamous non-keratinized epithelium.

The author mentions that this epithelium sits on a basement membrane and is connected to the underlying connective tissue (stroma), whose structure houses cells and allows the transit of fluids and nutrients, useful for the maintenance of the matrix and the overlying epithelium.

The author points out that the origin and proliferation of the corneal epithelium can occur in two different ways: a). derived from the adjacent conjunctiva by trans conjunctival differentiation, or b). It comes from the corneal stem cells of the basal epithelium of the limbus.

These "stem cells" are defined by this researcher, as any cell with a high capacity for self-renewal that extends throughout the adult life of the organism.

Regarding this last situation, the author emphasizes that as the corneal stem cells originate in the limbus, any damage at this level leads to a lack of these cells, which leads to the "conjunctivalization" of the cornea with vascularization, the appearance of goblet cells and an irregular and unstable epithelium.[8]

Ramos, T., and collaborators expand some data in relation to the epithelium of the ocular surface, indicating that the cornea and sclera are covered by stratified, non-keratinized corneal and conjunctival epithelia.

They also mention that the corneal epithelium has 5-7 layers of cells, while the conjunctival epithelium has 3-5 layers of cells, and that both form the front surface of the eye (the ocular surface).

These authors highlight that the corneal epithelium centrally and the conjunctival epithelium that surrounds it, are conserved by different populations of stem cells (stem cells of the limbus for the corneal epithelium and stem cells of the conjunctival epithelium).[9]

Ziaei M et al. (2018) point out the importance of the renewal of the corneal epithelium, in the continuous maintenance of function as a barrier against external environments and various aggressions.

They mention that, after trauma, exposure to toxic agents, mechanical injuries, and infections, in addition to damage to the corneal epithelium, the lesions can reach to the stroma, and in both cases the healing cascade is activated to minimize the risk infection, opacification or perforation.[10]

Studies on the management of epithelial defects caused by chemical burns by Soleimani, M. and Naderan, M. (2020), highlight the important role of intact epithelium in preserving the stability of the stroma, by preventing enzymes from digesting it, which accelerates the reconstruction of the ocular surface.[11]

The studies of the Hancox group (2020) on the corneal epithelium layer reveal several interesting data such as: conformation by non-keratinized stratified squamous epithelium, with about 5-7 layers of cells, which represents around 10% of the total corneal density.

They also emphasize that this epithelial layer includes the tear film, surface cells, wing cells, basal cells, and basement membrane cells, which is in the lower part of this epithelial layer. This group highlights that the main function of the epithelium layer is to allow the uniform distribution of moisture to the surface of the cornea through cooperation with the tear film and the smoothness of its surface.

They attribute to the collagen lamellae and the extracellular matrix (ECM) produced by keratocytes, the maintenance of the contour and transparency of the cornea.

By specifying collagen fibers, they refer that their thin fibrils form a lamellae structure of the same size and oriented parallel to each other, which gives the cornea its shape and birefractive property.[12]

Extensive research on the corneal stroma by Chen, S., et al., (2015), reveal that the main cells that inhabit it are keratocytes, responsible for the synthesis and secretion of the components of the extracellular matrix (ECM) of the stroma, including collagen fibrils (regulated by keratocytes) whose optimal organization provides transparency and supports the necessary structure for the refraction of light.

An important conclusion from these researchers refers to the fact that the finely controlled assembly of the extracellular matrix of the stroma is essential for the function and mechanical stability required to maintain the shape and curvature of the cornea.[13]

Studies by Hao Y et al. (2000) mention that the stroma (connective tissue) produces multiple growth factors that determine the proliferation and maintenance of corneal stem cells and inhibit the production of fibrotic tissue by local fibroblasts.[14]

In relation to the cornea, investigations have focused on the surrounding limbal and conjunctival regions, due to their functioning as supporting tissues for it.

Initial studies by Rosellini A, et. al., (2007) make special reference to the fact that the limbus of the cornea (between the corneal and conjunctival epithelium), and its limbal stem cells (LSC) are essential in the maintenance and repair of the corneal epithelial tissue.

Corneal tissues are affected by the responses of inflammatory cells, the arrival of which causes the formation of scars and the destruction of the limbus area, and these authors synthesize that the main factors that threaten corneal clarity are inflammatory reactions, neovascularization, and the deficiencies of limbo.

The studies reviewed by this group, highlight that they were more focused on the characteristics of the cornea, such as the immune response, angiogenesis and cell signaling.[15]

In relation to the limbal epithelium, two groups of authors are cited, who offer a broad perspective of its constitution and function, such as Kolli, et al., (2014) and Tsai, et al., (2015), who point out its peculiar characteristics, among them that they provide the separation of the conjunctival and corneal epithelium, with a narrow border between them, highlighting that the corneal stem cells (LSC) reside in said limbal epithelium.

They describe that the limbic epithelium acts as a barrier between the centrally clear avascular cornea and the peripherally opaque vascularized conjunctiva.

Both groups state that these limbal stem cells are essential for the maintenance of the adult cornea and determining factors in the repair and regeneration of damaged corneal epithelial tissue.[16][17]

With the intraocular application of certain products, it is intended that the healing is complete with stable epithelium, minimal scarring, and prevent coverage of the cornea by conjunctival epithelium, and neovascularization.

According to De Pascalis, C., & Etienne-Manneville, S., the chemical and physical properties of the environment control proliferation, or cell differentiation, and in three-dimensional environments, cells must rapidly adapt to the physical properties of their environment.

In addition, they point out that in such a microenvironment, when a cell is related to a permissive surface, be it a substrate or another cell, it will form adhesive structures that allow it to respond to the properties of its environment.

This same group notes that cells detect two types of information: chemical signals (small molecules and soluble factors), and physical properties (stiffness of the substrate, topology, porosity, elastic behavior, or compression and traction forces).

They state that the stiffness of the substrate substantially controls the mechanical responses of the cells.

Research by the same group mentions that cells detect signals from the environment, to respond with immediate responses that generate cytoskeletal rearrangements and changes in cell shape and motility.

This reciprocal relationship between the cell and the physical property of the environment is crucial during cell propagation, migration, and adhesion.[18]

Outstanding studies for educational purposes of the Ocular Surface Center Berlin (OSCB), highlight the importance of the following anatomical, histological, and reparative aspects of the ocular surface:

1. "The Conjunctiva of the eyeball is located on the outside of the sclera, and it is continuous with the moist epithelium of the Corneal connective tissue, termed as the 'Stroma'.
2. The sclera makes up most of the wall of the eyeball, made up of thick connective tissue, stronger than similar corneal stroma.
3. The thickness of the sclera is roughly around 1 millimeter, but it varies in different regions. It has 0.8 mm thickness at the front before it transforms into the cornea.
4. The building material is the protein 'Collagen', composed of bundles of collagen fibers, that have a different arrangement. The main producers of collagens are connective tissue cells called fibrocytes, or fibroblasts, which at the corneal level are recognized as "keratocytes".
5. The cornea is made of a protein called keratin.
6. The corneal epithelium is constantly replaced and renewed, starting from epithelial stem cells located in the corneal periphery in the limbus, located in the so-called palisades of Vogt, where the epithelial rete pegs are immersed deep between the papillae of the stromal connective tissue, arranged in a radial pattern.
7. The corneal stroma is composed of collagen fibrils produced by stromal keratocytes.
8. The peripheral region of the cornea (limbus) preserves corneal integrity and transparency for visual function.
9. A destruction of the corneal epithelial stem cells for any reason can disturb the visual function severely.
10. The stem cell niche of the corneal limbus induces the continuous regeneration of the corneal epithelium, and the deficiency of these cells facilitates the excessive growth of the conjunctival epithelium on the cornea (conjunctivalization), which causes the loss of transparency and visual acuity.
11. The Cornea and Sclera are continuous but differ in internal structural conformation.
12. The transparency of the cornea is a direct effect of the highly ordered regular arrangement of the collagen fiber bundles and the low water content.
13. In the sclera, the dense collagen structure causes stiffness and it has a higher water content."[19]

The extracellular matrix (ECM) is fundamental in the understanding of ocular stromal structures, due to important actions that are highlighted below: first: its presence reduces the time of stromal restructuring and second due to newly discovered implications of immunological actions that can be aroused in the host.

Investigation of the composition and function of ECM in various tissues and imitation and construction of biological scaffolds with high biomimetic properties, have been important areas extensively studied for their influence on cell behavior, including adhesion, differentiation, proliferation, migration, and functional expression.

Structures and soluble signals of ECM play a vital role in cell determination, differentiation, proliferation, survival, polarity, and migration, and it is important to address first some related concepts that need to be kept separate in thinking about and analyzing the functions of ECM as localized, multivalent cellular and signal integrators.

A summary of the reports in the literature, which have focused on the extracellular matrix ECM, is made:

Bissell M J, & Hall H G, Parry G (1982) provide an in-depth analysis about the structural and functional combination of the extracellular matrix (ECM) in which they highlight that its ultrastructure is made up of a diverse mixture of proteins, glycoproteins and glycosaminoglycans, among other molecules.

Regarding the functional aspect, they point out that the (ECM) interacts in dynamic reciprocity with the cell's resident in the cellular microenvironment and is subject to metabolic changes linked to mechanical properties, pH, oxygen concentration and other variables.[20]

Ingber D. (1991): ECM should be understood as a substrate that constantly changes in "dynamic reciprocity" with tissues, whose structural-functional support favors cell growth and signaling.[21]

Alberts B, Johnson A, Lewis J, (2002) have described that tissues are made up of cells and a network of macromolecules that constitute the extracellular matrix, composed of a variety of proteins and polysaccharides (locally secreted) and built in a mesh organized in connection with the surface of the cell that produced them, highlighting the active role of this structure, which influences the development, survival, migration, proliferation, shape and function of the cells that come into contact with it.

They also state that there are other proteins other than collagen in this structure, which have specific binding sites for various macromolecules of the matrix and for receptors on the surface of cells.[22]

Studies by Li L, Xie T. (2005) on the organization of the ECM refer to the fact that cells can be immobilized and anchored to the matrix and highlight that this last event is essential for epithelial cells, including adult stem cells, to maintain polarity, organization, and function of tissues.[23]

In reference to the extracellular matrix (ECM), in the works of Chan, B. P., & Leong, K. W. (2008), five functions are attributed to this structure: Firstly, provides structural support and physical environment for cells residing in that tissue to attach, grow, migrate, and respond to signals.

Secondly, gives the tissue its structural and mechanical properties, such as firmness and elasticity that is associated with the tissue functions. Thirdly, provide bioactive cues to the residing cells for regulation of their activities. Fourthly, may act as reservoir of growth factors and potentiate their bioactivities. Fifthly, provides a degradable physical environment to allow neovascularization and remodeling in response to developmental, physiological, and pathological challenges.[24]

Daley W P, et. al., (2008) when reviewing the dynamics of the extracellular matrix, suggest that it is composed of biochemically and structurally diverse components.

Biochemically, these components are divided into proteins, proteoglycans, and glycoproteins, with various individual physical and biochemical properties.

They also refer that, at the microenvironment level, cell-cell or cell-substrate contact will form adhesive structures that will allow it to respond to the properties of that environment.

These authors, when analyzing the physical properties of the ECM in cell behavior, pointed out that stiffness, porosity, insolubility, and topography are essential for the structure and integrity of tissues, and in cell migration and anchorage. [25]

Several studies, carried out by Hynes R O, (2009) indicate that the extracellular matrix (ECM) and the environment that surrounds it, influence the function and modulation of various aspects of cell biology.[26]

Studies conducted and published by Reilly G C, Engler A J. (2010) About the extracellular matrix (ECM) denote the important role of this conformation in cell behavior and tissue function, which can vary due to its biomechanical properties, such as elasticity, from soft, docile, and rigid.[27]

Votteler M, et al. (2010): the ECM acts as a deposit of structural and functional proteins, which when degraded releases "hidden" bioactive peptides, and serves as a niche for soluble factors and macromolecules, which allow the differentiation of stem cells and guide cell fate.[28]

An important contribution by Egeblad M, and collaborators (2010) highlighting that the orientation of the collagen fibers present in the ECM can lead in an outstanding way the migration of the cells, possibly by enhancing the growth factor receptor signaling or by mechanically enhancing cell migration.[29]

Lu, P., and collaborators (2011) emphasize that cell-ECM interactions are reciprocal.

Thus, the change in the composition and topography of the ECM is produced by the actions of the cells that create, disrupt, reorganize, and realign the components of this structure.

They further recognized that any change in the dynamics of the ECM due to cellular activities will in turn influence adjacent cells and change their behaviors.

In abnormal ECM, involvement of the local microenvironment and activities of stromal, endothelial, and immune cells has been observed.

These authors highlight in their conclusions, that the components of the ECM are functionally diverse, with a wide range of cellular activities, and at the same time dynamic due to the constant remodeling processes in which one or more of its essential properties are modified.

They further affirm that due to cell-ECM interactions, modulation of these dynamics is an effective measure for cells to respond to environmental changes, adapt their behaviors, and maintain tissue integrity and function.

These authors refer that the properties of the extracellular matrix (ECM) such as rigidity, porosity, insolubility and topography, determine the behavior of the cells that reside inside it, and its performance as a mechanical support favors association with the basement membrane.[30]

Lu P, et al. (2011): The dual ability of the ECM to modulate cellular activity while simultaneously remodeling itself during development and morphogenesis of tissues.[31]

Hynes R O, Naba A. (2012): ECM is a set of structural and functional components that include collagens, glycoproteins, proteoglycans, mucins, elastic fibers, and growth factors.[32]

Bonnans, C., et al., (2014) define that the extracellular matrix is a three-dimensional non-cellular structure present in all tissues, whose composition differs into two main types: the interstitial connective tissue matrix, which surrounds the cells and provides a structural scaffolding, and the basement membrane that separates the epithelium from the surrounding stroma and controls cell organization and differentiation through interactions with cell surface receptors and ECM proteins.

In turn, they refer to the fact that both structures have different structural proteins, so the interstitial connective tissue matrix is mainly composed of collagen I and fibronectin, and in a more complex and cohesive way the basement membrane composed mainly of collagen IV, laminins, heparan proteoglycans sulfate (HSPG) and proteins, such as nidogen and entactin, that are synthesized and secreted by epithelial and endothelial cells.[33]

Brown, B. N. and Badylak, S. F. (2014): ECM is a reservoir of structural and functional proteins that direct cell behavior, phenotype, and survival, and facilitate remodeling by resident cells.[34]

The studies of Eweida A M, and Marei, (2015) on natural scaffolds for dermal regeneration, refer to the fact that they are formed by a complex mixture of structural and functional proteins, glycoproteins and proteoglycans arranged in a three-dimensional (3D) ultrastructure, and that said bioactive components retained in this structure contribute to tissue regeneration.[35]

By studies by Kweon et. al (2016) it is known that the ECM is a dynamic 3D structure, and that cells live around it in an ecological environment.[36]

The De Pascalis group, (2017) refers that the microenvironment of the extracellular matrix is composed of cells and the surrounding intercellular medium, they highlight that beyond providing structural support, it binds to soluble growth factors, which are distributed, activated, and presented to cells in the form of spatially organized and directed multivalent signals.

These authors reported that cells when migrating use adhesive structures to adapt their mechanical properties, perform movements, and relate to their environment.[37]

Studies on the preparation of scaffolds from cultured cells by Chen G, & Kawazoe N., (2018) explain that the extracellular matrix (ECM) interacts with cells to control their functions and provides important signals that maintain homeostasis in living organisms.[38]

Leong M, et al. (2020): the structure of the ECM stabilizes the tissues and regulates the performance of the cells that contact it, which produce the macromolecular components, including (1) glycosaminoglycans (GAGs) or polysaccharide chains and (2) fibrous proteins such as collagen, elastin, fibronectin, and laminin.[39]

To understand the arrangement and actions of the conjunctival extracellular matrix, and the possible substrates to replace it, Makuloluwa and collaborators (2021) indicate that the ECM is composed of two components: the basement membrane and the interstitial matrix.

Relating to the basement membrane, they explain that it is secreted particularly by epithelial cells that contain laminins and type IV collagens, and in their function, it favors the adhesion and differentiation of epithelial and goblet cells.

Regarding the interstitial matrix, they indicate that it is secreted by fibroblasts in the lamina propria, and its main contribution is related to the mechanical and structural support of the tissues.[40]

According to the studies from Rusenko, (13) the basement membrane zone is important for graft adhesion and stability.[41]

Furthmayr cited that adequate and permanent graft take is dependent upon the formation of a complete basement membrane zone.[42]

On the architecture of the human esophageal epithelium by the studios of Watt FM, Seery JP. (2000), reference is made to the asymmetric divisions of stem cells, that occurs by the action of the basement membrane, which by inducing cell differentiation builds the general architecture of the epithelium, and at the same time, serves as a route for cell migration and functions as a defensive barrier.[43]

The basement membrane or basal lamina has been highlighted by Yurchenco P. D. (2011) because plays an important role in the morphogenesis of the tissue and the maintenance of function, that controls cell behavior.[44]

Important contribution about the orientation of cell migration through the substrate, was provided by Doxzen K, and collaborators, (2013) who indicated that cells obtain information from the environment, and from neighboring migratory cells.[45]

It has been suggested by Causa F, Netti P A, Ambrosio L. (2007) that biomaterial design has focused on creating physical and biochemical environments that guide tissue regeneration and this seems to be a reliable approach to control cellular behavior.

These authors recognize the deficiencies in the biological recognition of synthetic scaffolds for tissue regeneration, so current attention has focused on the use of natural materials as a source of analogous tissues with multiple functions.

Chan, B P and Leong, K W (2008) highlight the difficulty of accurately imitating the extracellular matrix, derived from the multiple and dynamic functions of this structure, so that any substitute partially emulates its functions.[46]

These same authors, when referring to the integration of scaffolds in the tissues after being implanted, is facilitated by the presence of pores for the transport of nutrients and metabolites, whose efficient vascularization and degradation rapidity coincide with that of the production of new matrix by developing tissue.[47]

Freed et al. (1994) proposed that scaffolds should possess a porosity of at least 90% to allow for adequate nutrient diffusion and tissue ingrowth during in vitro culture.[48]

The studies by Mooney D J, et. al (1996) highlight the need for scaffolds to have a geometry of open pores and perfectly interconnected, which facilitate the exchange of nutrients and waste between cells and their environment.[49]

The key characteristics of the ideal scaffold proposed by Negut, I., et. al. (2010) are essentially the same as those used by Chan, B P and Leong, K W (2008), who state that they must possess: adequate physical and mechanical properties, to allow cell adhesion, proliferation and/or differentiation, with interconnected pores that allow the formation of blood vessels, accelerate the formation of granulation tissue and subsequent re-epithelialization.

They also emphasize that the framework should preferably be biocompatible and biodegradable, with a degradation profile that is concomitant with the wound healing period.[50]

In a study carried out by Q.-M. Jin, H. Takita, T. Kohgo et al., (2000) reported the importance of pores in implants, whose presence plays a critical role in the effectiveness of their mechanical properties, and especially in their biological performance, such as cell attachment, proliferation and differentiation, and the transport of nutrients and metabolic wastes.[51]

The studies by Zeltinger J, et al. (2001) report that in scaffolds, apart from the presence and interconnectivity of the pores, their size is a determining factor in adhesion, cell proliferation and matrix deposition, and they point out that the width of these pores can affect cell infiltration and proliferation, due to their preferences at a certain size, and proposed that scaffolds with pores of less than 38 um be used to grow the epithelial coating in vitro.[52]

Studies carried out by Vassilis K, and David K. (2005) on the effects of porosity in the osteogenesis of 3D biomaterial scaffolds, make them conclude that these must be highly porous, to optimize the space that allows cell adhesion and migration.[53]

The presence of pores is a critical part of scaffolding and Salerno A and collaborators (2012) explain that open and interconnected porous networks are essential for nutrition, cell proliferation-migration, and vascularization by making use of the surrounding tissue to improve the mechanical stability of the implant.

In addition, these authors indicate that the network structure of the pores helps guide and promote the formation of new tissues.[54]

Tan's group (2012) recommends that the pores should be large and interconnected to facilitate cellular infiltration, ECM deposition, and vascularization in the interior regions of the scaffold.[55]

Discusses the challenges and strategies for facilitating and promoting tissue repair, Bružauskaite, I., et. al. (2016). defined in a few words, the facilitation of these processes: "different sizes of scaffold pores, different cellular effects".

They indicate that scaffolds with mechanical stability, biodegradability, appropriate size, surface roughness and porosity are required to generate the microenvironment that facilitates repair at the implant site.

They also explain that the size of the pore immediately influences the functioning of the implanted material, due to the diffusion of nutrients and oxygen, the elimination of waste, ease of migration and cell-cell interaction inside the implant.[56]

Recent report in the literature about the actions of three-dimensional scaffolds like the human extracellular matrix by Zhu, and collaborators (2017) highlight that these materials can act as an inductive template for the reconstruction of tissues and organs.

These authors also report that the architecture of biodegradable 3D scaffolds, analogs of the extracellular matrix (ECM), both at the macro and/or microscale level, should favor cell functions, including cell-matrix adhesion, cell adhesion-cell, cell migration, proliferation, differentiation, etc.

This group also contributes to the understanding of the structural and functional properties of the basement membrane, (a special type of extracellular matrix), which by adapting the tissues to a correct size-shape, and providing physical and biochemical signals to the cells, influence in the function of tissues.

They note that the regulation of biochemical signals that stimulate cells occurs through the integrin, which in turn is governed by the availability of ligands.[57]

In relation to persistent corneal epithelial defects and recurrent erosions, Goldman J N, et al., (1969) highlight that these are explained by damage to the basement membrane, which, however, is restored again.[58]

In writing 2019 cutting edge article, Nikolova, M. P. and Chavali, M. S., listed the main challenges facing 3D scaffolds, including: (1) Structural surface properties optimized to improve cell adhesion and ECM deposition in the microenvironment of host tissues, (2) facilitation of vascularization to prevent implant failure, (3) Spatial and functional cellular regulation capacity, (4) Safety and simplification in procurement and manufacturing, (5) Minimize adverse effects and secondary damage, and (6) Mass production outside the laboratory environment.[59]

In the connective tissue microenvironment, dynamic and reciprocal interactions occur between cells and the extracellular matrix (ECM), crucial in the degradation or remodeling of the ECM.

It is understood that the ECM is subject to sustained remodeling mediated by interactions between this structure and its resident cellular components, according to the opinion of Daley and collaborators.[60]

In a study investigating ECM remodeling, Cawston T E, and Young D A. (2010) reported that proteins outside or inside a cell are subject to degradation and regulation of ECM Topography, particularly by the enzymatic action of metalloproteinases.[61]

The processes for the remodeling and degradation of scaffold materials prepared in similarity to the extracellular matrix formed the central focus of studies by Brown, B N and Badylak, S F (2014) in which the authors report that this occurs mainly by cellular and enzymatic mechanisms.

They explain that in the tissue microenvironment, these processes are mediated by inflammatory cells, such as macrophages, which produce oxidants and proteolytic enzymes that help in the degradation of the scaffold, whose effect, in turn, is the recruitment of stem and progenitor cells from the host into the site of degradation.

These authors also refer that ECM-based scaffolds, from the initial preparation, must retain their basic structure, so that constructive remodeling and subsequent degradation lead to better clinical results derived from their use.[62]

Lu, and co-workers explain that the extracellular matrix (ECM) is a highly dynamic structure, which is constantly being remodeled by components of the neighboring microenvironment.

This dynamism is essential during cell differentiation and restructuring of tissue architecture.[63]

The remodeling and degradation of the extracellular matrix have become a central topic of research and Bonnans, C., (2014) and his group explain that this process is mediated by enzymes and metalloproteinases are mainly involved, whose activity increases during repair or remodeling processes and in diseased or inflamed tissues.

They also refer that certain cell, such as myofibroblasts, constantly rebuild and remodel the ECM through synthesis, degradation, reassembly, and chemical modification.[64]

In her review of the tear film and its importance in the maintenance of tissues, or adjuvant in the healing of ocular wounds, Klenkler B, Sheardown H, Jones L. explain that this is due to several biologically active growth factors secreted by the gland lacrimal and distributed through tears on the ocular surface, where they affect cell proliferation, migration, differentiation, and survival.[65]

Kuhn L, (2005), associate Professor of Biomedical Engineering, University of Connecticut Health Center, presented a significant analysis on the factors that influence the non-existence of toxicity of biomaterials, which in contact with living tissues could affect them, and cites that the absence of toxicity refers to non-carcinogenic, non-pyrogenic biomaterials, non-allergenic, compatible with the blood and non-inflammatory.

She also made special mention of the value of the search in nature on the design, selection, synthesis, and manufacture of biomimetic biomaterials, which implies imitating aspects of natural materials or living tissues such as their chemistry, microstructure, or manufacturing method.[66]

In previous studies of materials intended to meet the human body (biomaterials) and biocompatibility essential to elicit an appropriate host response, Williams D F. (2008) has suggested that this attribute refers both to the compatibility of the material, as well as its ability to perform a specific function that generates the appropriate biological, chemical and mechanical acceptance, when used in a specific situation.[67]

In a study on the biocompatibility aspects of medical devices intended for prolonged contact with the tissues of the human body, Le Duc P, & Wang Y. (2006) reported that it is essential that the material does not damage the tissues by chemical or biological actions.

They describe that the surface of the transplants is the one that provokes immediate biological responses in relation to the adsorption of proteins at the material-tissue interface.

And they attribute this to the presence in the body fluids of ions in solution, as well as lipids, carbohydrates and proteins that can be adsorbed on the surface of the material.[68]

Studies on the composition and organization in the cellular microenvironment and subsequent interrelation with one or more cells are particularly due to adherence, and the authors De Pascalis, C. and Etienne-Manneville, S. (2017), indicate that this is due to chemical signals, small molecules, and soluble factors, which encourage adhesion at the cellular level, to adapt to the properties of its environment.[69]

Studies by Williams D F. (2009) on the nature of biomaterials to create neo-tissues similar or identical to the body's own at injury sites, point out that biodegradable support matrices and scaffolds are required, with structural and functional attributes that favor union cellular in wound healing events.[70]

Recent studies on scaffolds that mimic the extracellular matrix by the groups of Vishwakarma A, et al., (2016) and Rowley A T, et al., (2019) have revealed the active participation of these materials when implanted in damaged tissues by recruiting and activating immune cells, creating a pro-regenerative immune environment, in addition to allowing the circulation of structural signals that promote cell migration and stem cell differentiation.[71] [72]

Ahearne, M et al., (2020): During scaffold degradation, in principle, the native ECM molecules must replace the structure without compromising its integrity or functionality.[73]

A growing body of literature has examined the different methods in ocular surface reconstruction, and in this regard Espana, and collaborators (2013) include transplants of autologous conjunctiva, limbus stem cells (LSCT), oral mucosa epithelium or amniotic membrane (AM).[74]

In the repair and reconstruction of the conjunctiva and cornea with severe damage, several biological tissues have been used and Malhotra, C. and Jain, A K (2014) report that among others, oral, labial, and vaginal mucous membranes, the rabbit peritoneum, and the human amniotic membrane have been used.[75]

It has been described by Sangwan and collaborators (2007) that the amniotic membrane has been used to solve various problems of the ocular surface in at least 20 ophthalmic procedures, and among other corneal and conjunctival epithelial defects, pterygium surgery, acute and chronic chemical injuries, Steven Johnson syndrome, and in the treatment of ocular cicatricial pemphigoid.[76]

Also, matrix products supporting cells growth include preparations derived from Small intestinal Submucosa or SIS now commercially available, include, but are not limited to, Oasis™, Surgisis™, Surgisis-ES™, Stratasis™, and Stratasis-ES™ (Cook Urological Inc.; Indianapolis, Ind.) and GraftPatch™ (Organogenesis Inc.; Canton Mass.) and the ECM derived from urinary bladder (UBM).

The publication by Spaniol K, et al. (2017) describes those different materials are used for the reconstruction of the conjunctiva, including the conjunctiva itself (autologous), the mucous membrane of the mouth or nose and the amniotic membrane.

This group describes several limitations in the use of them, among which: low availability, involvement in autoimmune diseases, heterogeneity of donors and degradation in an environment with inflammation.

And in their conclusions, they point out that according to these difficulties, new resources are necessary for conjunctival replacement.[77]

In relation to the complications and limitations of the use of the amniotic membrane, previous studies in this area of research have reported increasing uses in ophthalmology, however there are warnings of indiscriminate use since complications can occur, although infrequent.

Thus, the studies of the group by Dua (2004) on the use of this structure, describe that there are risks of transmission of bacterial, viral, or fungal infections if the donors are not properly examined, if the membrane is not processed under sterile conditions or if the storage is inadequate.

They also describe that the premature degradation of the membrane makes frequent repeated transplants necessary, and that on occasions, subepithelial residues persist in some cases and involuntarily opacify the visual axis.[78]

In previous studies on the treatment of chemical/thermal injuries with the amniotic membrane, Gabler & Lohmann (2000) published an article on adverse reactions secondary to its use, describing the possibility of accumulation of blood underneath it, which causes premature removal of the transplant.

Other complications included in the article, indicate that granulomas have been observed around the membrane sutures.

The author also reports on the formation of persistent subepithelial membranes, which by residing in the visual axis reduce their functionality and concludes that the disintegration of the membranes is also frustrating.[79]

When evaluating 20 patients with acute chemical burns that affected the cornea and treated with Amniotic Membrane, Nubile M, Dua H S, Lanzini T E M et al. (2008), using in vivo laser scanning confocal microscopy (IVCM), evaluated the healing of the corneal epithelium after transplantation of said membrane.

Their results highlight that the amniotic epithelium was lost within 15 days after transplantation and their conclusions highlight the observation that when using the amniotic membrane as a patch, the epithelial cells migrate under the membrane instead of over it, a condition that causes the membrane to disintegrate and be lost.

They also suggest that the use of the amniotic membrane be applied as a graft with actions as a basement membrane that will promote migration and epithelial growth and not be used as a patch.[80]

The group of Clearfield E, (2016) in their studies on treatment in post-excision pterygium, when comparing the use of conjunctival autograft with the amniotic membrane, in a systematic review of Cochrane meta-analysis, the conjunctival autograft implies a lower risk of recurrence six months after surgery than the use of the amniotic membrane.

Based on the results of this analysis, they conclude that the optimal treatment following removal of the pterygium is achieved with the conjunctival autograft.[81]

The human amniotic membrane is the scaffold most frequently used as therapy for ocular surface disorders, and in relation to the reconstruction of the stem cell niche of the limbus and corneal surface, the group of Yazdanpanah, (2019) experienced inconveniences in the use for this purpose, and the following stand out: First, the opacity and possible risks of infectious diseases. Second, the low tensile strength, due to the variability between batches. Third, the temporality of the benefits due to the disappearance after the transplant.

They conclude that amniotic membrane therapy may not rebuild the limbal niche in the long term.[82]

U.S. Pat. No. 6,893,666 (Pag. 1, lines 45-48) discloses a composition and methods for using a tissue regenerative matrix to promote the restoration, remodeling, or repair of connective tissue.

The composition of the matrix comprises devitalized mammalian epithelial basement membrane of the intestine and tunica propria, which can further include submucosa, tunica muscularis, growth factors, a cell, or a polymer. For the purposes of this invention, devitalized means acellular or substantially acellular which differs in the present invention which preserves the cells in their natural form.

Dayuthapani B, & Sakthikumar D. (2017) have suggested that in the applications of polymeric products for the regeneration or replacement of native tissues, the implants must be made of biomaterials that promote cell and tissue growth through adhesion, proliferation, and cell differentiation, adapt to tissue responses, avoiding unwanted effects, and especially preventing immune responses.[83]

There is a considerable amount of literature on the design and manufacture of polymer-based scaffolds, among them those carried out by Bracaglia et al. (2017) and Li et al. (2018) who highlight that any scaffold when transplanted must facilitate one or more of the following functions:

(i) Surface that favors the interaction of cells and different biochemical factors; (ii) Make it possible for said interaction to allow the adequate union and migration of cells, by exerting mechanical and biological stimuli; (iii) Enable the flow of cellular nutrients; (iv) Mimic the microenvironment like that provided by the native extracellular matrix (ECM).[84] [85]

Chen, FM, & Liu, X. (2016), in their research on biomaterials for tissue restructuring, define that they are devices or implants whose use allows to repair/replace native body tissues or as a scaffold to build tissues and organs.

These authors state that biomaterials for tissue regeneration can be classified into two categories: (I) living or once-living material of animal or human origin; and (II) other materials of plant or synthetic origin.[86]

Williams DF (2019) refers to mandatory and some optional specifications of biomaterials, depending on the application, such as: bioactivity, adaptation to the constantly changing microenvironment, morphological and chemical degradation at the required time, adequate elastic/viscoelastic properties, no cytotoxic, non-immunogenic and minimally pro-inflammatory.[87]

Nikolova, M P, & Chavali, M S (2019), referring to the advantages of using natural polymers for 3D scaffolds, report that they exhibit better cellular interactions and lack inappropriate immune responses, and that on the contrary, synthetic polymers trigger immune responses and toxicity.[88]

Dolcimascolo's group, (2019) analyzes the challenges and strategies to facilitate and promote appropriate materials to produce scaffolds, which currently include different types, such as natural or synthetic polymers, ceramics, metals, or hydrogels.

In their analysis they highlight that the materials must meet the following key requirements: (i) biocompatibility, (ii) bioactivity and (iii) biodegradability.

Thus, they describe those biomaterials should facilitate a biomimetic environment like native tissue, capable of modulating cellular behavior and response, which, when integrated into the host's tissue, is recognized as its own, without provoking immune or inflammatory responses.

In the analysis they explain that the macrostructural properties refer to a 3D architecture that mimics the extracellular matrix (ECM), while the microstructural properties refer to the porosity of the scaffold, related to the shape, size and interconnectivity.[89]

Recent report by the group of Caballé-Serrano J, (2020) recapitulates the properties that scaffolds must provide and include: (1) high biocompatibility, (2) structure with interconnected pores (to allow the entry of progenitor cells and blood vessels), (3) mechanical properties similar to native tissue and (4) degradation properties that coincide with the characteristic speed of the tissue to be regenerated.[90]

Muzzio's group, (2021) outlining the processes necessary for the development of new implants and medical devices that seek to imitate cellular and tissue characteristics like the natural ECM, indicate that the interactions of different biochemical signals and their influence in cellular behavior, must be fully understood.[91]

Kim M S, and collaborators (2018) in their studies on cell migration in biomimetic implants to direct the formation of new tissues and originate specific cellular responses, mention that biological materials tend to provoke a favorable response in the host, by favoring the deposition of functional tissue at the desired site.[92]

The advantage of using biomaterials of biological origin for the repair of ocular tissues, highlighted by Chen, F. M. and Liu, X. (2016) is since these induce the remodeling, repair-regeneration, and functional restoration of lost or damaged tissues.[93]

Yu X, and his colleagues (2015) studied the way in which biomaterials promote cell adhesion, proliferation, and differentiation, and indicated that this is a consequence of the ability to interact with surrounding tissues, a term known as bioactivity.

Generally, biomaterials with a chemical composition comparable to the host tissue have high bioactivity, which benefits cell recognition and the growth of new tissues.[94]

Natural biomaterials usually have excellent biocompatibility, so that cells can adhere and grow with excellent viability.

The historical review on xenotransplantation reported by Copper (2012) on the transplantation of organs between species, indicates that the efforts go back more than 300 years.

Copper highlights that in 1838 the first corneal xenotransplantation (from a pig) was performed in a patient, while the first corneal allograft (from human to human) was not performed until more than 65 years later, in 1905.[95]

This same author had previously written: "The increasing number of patients requiring organ transplantation has stimulated research on the use of animal organs for transplantation; pigs are considered the most likely potential source".[96]

The work of Beckstead et al. (2005) who studied the behavior of esophageal epithelial cells on a variety of scaffolds is a good example illustrating the superiority of biological materials.[97]

In the detailed examination of the potential of the use of porcine xenotransplantation as sources of organs and cells by Hara and Cooper (2011), these authors listed the advantages of using pigs as a source of tissues and particularly highlighted the following aspects:

1. Unlimited supply of organs, which would solve the growing and serious shortage of human organs.
2. The availability of elective form of its obtaining, of healthy pigs, perfectly controlled, free of pathogens
3. The advantage of immediate transplantation to the patient with acute organic failure, which would result in significantly improved They further highlight that Sir Peter Medawar (1960 Nobel Prize in Medicine), considered the father of transplantation immunology, declared in 1969: "We should solve the problem [of organ transplantation] by using heterografts [xenografts] one day if we try hard enough, and maybe in less than 15 years survival." [98]

The most recent attention on the use of porcine materials has focused on the provision of micro and ultrafine porcine urinary bladder matrix (UBM), by Wang, X., et al. (2021), using it in a model of corneal debridement wound induced in mice, in the form of sub-conjunctival injection, the results of which showed: 1. that UBM particles substantially reduced the formation of corneal turbidity compared to the group treated with Saline solution. 2. the UF-UBM suspension remained on the ocular surface for approximately 7 days, and importantly 3. they found that injection with UBM induced a potent type 2 immune response (IL-4 producing eosinophils in local corneal tissue and TH2 cells in the peripheral draining lymph node).[99]

Because of the anatomical and functional consequences that can result from inadequate treatments for eye diseases and injuries, there is a continuing need for alternative, particularly low-cost therapies that are easily accessible and easy to use.

The object of the present invention is to overcome the deficiencies of the state of the art and to provide a bioactive, biocompatible, degradable matrix with barrier functions, which guides the repair-regeneration processes for the reconstruction of the ocular surface.

To achieve the above object, the technical solution adopted by the present invention is to provide an inductive matrix for the remodeling, repair-regeneration, and functional restoration of lost or damaged ocular tissues.

Constituents of the fine structure of the tissue graft composition:

The human esophagus, according to Londono & Badylak is a tubular organ that structurally, it comprises four concentric layers: the mucosa, the submucosa, the muscularis externa, and the adventitia.[100]

Matrix is formed by nonviable cells of non-keratinizing stratified squamous epithelium, basement membrane, and loose connective tissue which together form a three-dimensional integrated structure.

It is necessary to highlight the study related to this topic, carried out by Zhu and colleagues (2017) on esophageal tissues pointed out that the lumen epithelium is composed of stratified squamous epithelial cells supported by the underlying basement membrane.

Regarding this structure, they indicate that it is a rough and irregular strip that consists of interlaced fibers and included in them are pores of unequal size.[101]

The author of the present invention considers that due to the intrinsic properties of this biomaterial, when being used and degraded within biological systems, damage to the host's tissues is avoided, attributed in part to the fact that both come from nature and the delicate processes of refinement during their elaboration.

Contributions to the world literature by Thankam's group (2020) on structures that seek to mimic the human and porcine ECM, manufactured from a variety of tissue sources, such as skin, heart, intestine, bladder, and adipose tissue, have demonstrated efficacy in tissue repair in preclinical models, clinical trials, and commercial use.[102]

One advantage is that the ECM components is generally well conserved and tolerated among species even by xenogeneic recipients according to Gilbert et al., (2006).[103]

The tissues that make up the bovine esophagus have been studied for more than thirty years by the author of the present invention, and in 1994, as co-author, obtained the patent of invention with the title Tissue equivalent membrane from bovine esophageal tissue No. U.S. Pat. No. 5,300,306 and then the invention patent under the title of Biologically active graft for skin replacement therapy US 2017/0080127 A1, on 2017 Mar. 23 (described hereinafter 0127), with variation with respect to the previous one due to the inclusion or retention of the basement membrane and connective tissue mainly intact (tunica submucosa).

In this patent (0127) the details of the elaboration of the matrix of this invention were included, highlighting the compliance with international quality and safety standards in its preparation, which are like the steps carried out in the elaboration of the matrix of the present invention.

It should be noted that the inventor of the present invention was granted the invention patent with the title Serous membrane for ocular surface disorders related to the use of porcine small intestine serosa (or serous membrane), by the Patent Cooperation Treaty (PCT) under No. PCT/IB2016/054024 dated Jul. 5, 2016 and subsequently granted by the U.S. Patent and Trademark Office (No.: US 2019/0038398 A1 Date Feb. 7, 2019).

During the time of application of said patent, it was noticed that the intestinal serosa disintegrated easily, losing its structural properties on the ocular surface in the first ten days, so the material object of the present invention was used, in authorized clinical cases (both institutional and patient) with ocular injuries, which evidenced from the first moment exceptional properties of consistency, stability, permanence and integration in ocular tissues, and this discovery was perceived by ophthalmic surgeons as an important advance in the reconstruction of the ocular surface (a real breakthrough).

In general, the method for preparing the heterologous matrix (HM) comprises the steps of obtain freshly harvested esophageal tissues of warm-blooded vertebrate, preferably porcine origin, from proper suppliers that ensure full traceability.

In all processes the standards to be met is done following Good Tissue Practices (GTP) to ensure that no contaminants are introduced into the tissue products.

It should be emphasized that in these processes, the equipment and the facilities are cleaned and decontaminated according to conventional and industry-approved decontamination procedures and all major processing are documented following industry practice, and FDA-USDA regulations standards.

It should be noted that in the process of purification and isolation of the matrix, the sophisticated processes of competitors are simplified, with lower costs and less human skill to prepare the final product.

In preparing competitive products, after the human extraction of the raw material, sophisticated laboratory equipment and manufacturing expertise is needed (for example, Engineers and personnel for the assembly and processing) before obtaining the final product.

The main limitation of these products is their expense: high price to compensate the high investment cost.

The matrix of the present invention is abundant, inexpensive and the methods to process provide effortlessness to manufacture while the competitors require high degrees of synthesis which drive up costs.

To counteract the above problems, the present matrix provides a new and effective form of reconstruction of the ocular surface, by facilitating the repair-regeneration process in a structural-functional way, whose action is aimed at promoting epithelialization, reducing inflammation, and prevention of complications.

Due to its intrinsic natural properties, the implant provides an anatomical and functional unit, which dynamically facilitates the union of cells and the function of the different tissues of the cornea and conjunctiva, with potential for use in a variety of ocular pathologies.

The microperforated porcine esophagus matrix accurately mimics ocular structures, whose natural template with a highly organized spatial-temporal pattern, suggesting crucial structural roles in the development and function of new tissues, being important also to highlight the bioactivity, biocompatibility, and metabolic integration.

Of the properties of the matrix, the following stand out:
(1) the 3D structure that favors cell adhesion, proliferation and deposition of the extracellular matrix, and the presence of pores that facilitate the transit of cells and signaling molecules or growth factors.
(2) Its functional properties that generate a biomimetic tissue microenvironment equivalent to native tissue, promotes the development of new tissues in a structural-functional manner.

The porcine esophagus matrix of the present invention intrinsically possesses the basement membrane, whose pre-existing component reduces the time required for the restructuring of the injured tissues, an attribute by which its excellent therapeutic effects are achieved.

The efficiency of the natural scaffold of the present invention is attributed to the presence of interconnected pores, which, acting in harmony with local conditions, favor the passage of fluids, cells, and different molecules (growth factors, cytokines, bioactive ions, etc.) that promote the safe and effective reconstruction of a functional tissue.

The matrix after implantation is integrated with the native tissues and the accelerated response of the local vascularization is an outstanding factor for the viability and tissue reconstruction, and in the clinical evaluations carried out it is deduced that its integration and resorption is perfect, due to the type of tissues obtained in the stromal and epithelial planes.

As described above, according to the present invention, with the use of the matrix of the present invention, it is possible to improve the connective tissue of the deficient stroma, as well as to stimulate re-epithelialization on the injured ocular surface, and its effects allow to obtain a higher therapeutic level.

Although the exact mechanisms causing such results are not yet fully understood, elucidating the precise responses that occur in its natural structure will allow for more controlled and efficient tissue repair-regeneration if progress continues.

Derived from the careful preparation and sterilization of porcine esophageal tissues, this material when interacting with the host cells, generates beneficial cell responses, which exclude immune reactions, which prevents the risk of graft rejection.

It should be noted that in none of the cases of use of the matrix, both on the skin and on the ocular surface, has there been any type of xenograft rejection (hyperacute, delayed, acute or chronic cellular), and the biocompatibility of the scaffold has shown the total absence of any reaction attributed to its use.

The main indications of the matrix of the present invention are directed to transplantation to some of the structures of the anterior segment, among them: cornea, conjunctiva, and sclera.

The matrix has proven to be a very versatile tool in the ophthalmological field, and derived from the greater knowledge of its properties, it makes it possible to consider expanding the indications for its use in carefully selected patients.

There are great opportunities for the use the matrix and the author speculate that by taking advantage of the knowledge and technology of the present invention, they allow the use in the design and optimization of new materials and scaffolds.

Although the current results are promising for its biocompatibility, mechanical resistance, high availability (mass production), manipulability and stability, more clinical trials are needed for its use in other pathologies of the ocular surface.

The author strongly believes that the widespread use of the implant will contribute to the optimal resolution of complicated ocular surface pathologies in the ophthalmic community, proactively addressing the needs of marginalized and vulnerable groups through targeted interventions.

From a social perspective, the product is accessible, for the benefit of the population that is poor and may need it in the future.

For developing countries, concerns about "access" to technology need to be considered.

The present invention addresses this need and solves a significant problem for less developed areas of the world with an affordable product.

The technical solutions of the present invention are further described in the following by means of specific embodiments, which are intended to facilitate a better understanding of the present invention, but the specific embodiments do not limit the scope of protection of the present invention in any way.

Current data in the form of large, randomized, controlled trials are lacking; however, the data that is available suggests that reliable, definitive repair of complicated ocular defects are achievable. The inventor notes that for every facet in this process, further research is still needed.

In conclusion it can be stated that much progress has already been made in the past ten years, and that the results obtained thus far show great promise regarding the future clinical application of the new heterologous matrix.

BRIEF SUMMARY OF THE INVENTION

The present invention refers to a new biological and biocompatible heterologous matrix, appropriately obtained and processed, a lyophilized porcine esophagus, wherein the tissue comprises a natural three-layer structure, characterized in that: one layer is a layer of stratified epithelial tissue and the other layer is a loose connective tissue, with a highly organized pattern that precisely imitates ocular structures, which can be used as a graft (substrate) or as a 'patch' (biological dressing) in a variety of injuries or conditions in the cornea, conjunctiva and/or eyelid, after trauma, diseases or surgeries, whose action as an inductive template in the extracellular space (ECM) favors cell-cell contact, cell-extracellular matrix and signaling molecules, which leads to development and function of new ocular tissues, in which its use does not present adverse immunological conditions, whose lyophilization process prolongs its clinical use.

BRIEF DESCRIPTION OF THE SEVERAL VIEWS OF THE DRAWING

Similar reference characters denote corresponding features consistently throughout the attached drawings.

DETAILED DESCRIPTION OF THE INVENTION

Figure 1A:
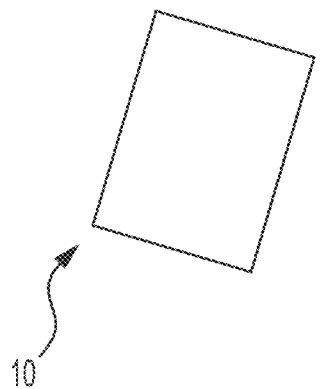
FIGS. 1A and 1B depict a heterologous matrix according to the present subject matter.

Description of the Preferred Embodiments of the Invention

A description of preferred embodiments of the invention follows. It will be understood that the embodiments of the invention are shown by way of illustration and not as limitations of the invention.

At the outset, the invention is described in its broadest overall aspects, with a more detailed description following.

The features and other details of the compositions and methods of the invention will be further pointed out in the claims.

It is also to be understood that the terminology used herein is for describing embodiments only, and is not intended to be limiting, since the scope of the present invention will be limited only by the appended claims.

Definitions

To provide a clear and consistent understanding of the specification and claims, the following definitions and terms are provided.

Antiseptic—A substance that inhibits the growth and development of microorganisms without necessarily killing them.

Basement membrane—Between the epidermis and dermis lies the basement membrane (basal lamina), which keeps the outer layer adhered closely to the lower layer, term usually used in light microscopy.

Biocide—A general term for any agent that kills organisms.

"Biocompatible," as the word is used herein, refers to a material that has not medically undesirable noxious or unfavorable effects on biological function.

Connective tissue—Refers to tissue that protects and supports the body and its organs, and tissues that bind organs together.

Chemical germicide—A chemical or a mixture of chemicals used to kill microorganisms.

Decontamination—Any process for removing and/or killing microorganisms.

Debridement—Is the removal of loose, devitalized, necrotic, and/or contaminated tissue, foreign bodies, and other debris on the ocular surface using mechanical or sharp techniques.

Disinfectant—A chemical or mixture of chemicals used to kill microorganisms, usually applied to inanimate surfaces or objects.

Disinfection—A physical or chemical means of killing microorganisms, but not necessarily spores.

Dressing—Any of various materials utilized for covering and protecting a wound.

Engraftment—Incorporation of grafted tissue into the body of the host.

Epithelial tissue—Refers to the cellular (typically avascular) layer covering all the free surfaces, cutaneous, mucous, and serous, including the glands and other structures derived there from.

Graft—Any tissue or organ for implantation of transplantation.

Granulation tissue—Newly formed vascular tissue normally produced in the healing of wounds of soft tissue and ultimately forming the scar; it consists of small, translucent, red, nodular masses of granulations that have a velvety appearance.

Host—Refers to an individual (whether human or non-human) into whom cells, tissue, blood, or organs are transplanted.

Matrix—Refers to a composition comprising a plurality of pores dividing free space into partially enclosed interstices wherein said interstices are in fluidic communication.

Microbicide—A chemical or mixture of chemicals that kills microorganisms.

Sterilization—A process that kills and/or removes all classes of microorganisms and spores.

Stroma—The supportive framework of an organ usually composed of connective tissue.

Tissue regeneration—Healing in which lost tissue is replaced by proliferation of cells which reconstruct the normal architecture.

Tissue repair—Healing in which lost tissue is replaced by a fibrous scar, which is produced from granulation tissue.

Xenograft—A graft of tissue transplanted between animals of different species

Matrix, as the term is used herein, is a heterologous matrix (HM) that comprises the mucosa, the basement membrane, and the submucosa of the porcine esophagus, appropriately obtained and processed.

In other embodiment the (HM) is a tissue covering. As used herein, the terms "tissue covering," "covering for ocular surface," and "covering" have the same meaning and include, for example, a dressing, a covering to protect tissue or to prevent adhesions, or to promote healing or growth of tissues.

As used herein, the term "subject" is used to mean any animal, preferably a mammal, including a human or non-human subject such as livestock (e.g., horses, cattle, and the like), domesticated animals (e.g., dogs, cats, and the like). The terms patient, subject, and individual are used interchangeably.

The term "treat," "treating" or "treatment" as assumed herein relates to combat the effects caused because of the disease or condition of concern in a subject.

The terms "transplant," "transplanting," "transplanted" or "transplantation" are used interchangeably herein with the terms "implant," "implanting," "implanted," "implantation," "graft," "grafted," or "grafting."

Transplant can refer to either the object being transplanted or the act of transplanting itself.

Transplantation refers to the act or the process of transplanting.

Means selected "ocular surface" any list structure comprising epithelia of the cornea, limbal-corneal or conjunctival tear film overlying or underlying stroma to these structures.

The invention is directed to heterologous matrix (HM), methods of use and producing the same, and therapeutic applications arising from their utilization.

The novel features which are believed to be specific to the invention, will be better understood from the following description of preferred embodiments.

In one embodiment, the term "heterologous matrix (HM)" refers to three-dimensional structure for implantation or transplantation that facilitate the structural and functional restoration of lost or damaged ocular tissues.

In accordance with one embodiment, the esophagus of a warm-blooded vertebrate is used in the preparation of a heterologous matrix (HM).

In general, a heterologous matrix (HM) for use in an embodiment comprise a biocompatible material.

In some embodiments of the invention, the mucosa, the basement membrane, and the submucosa that is used is porcine. However, those of skill in the art will recognize that the mucosa, the basement membrane, and the submucosa tunica serosa from other mammalian species may also be successfully utilized, (examples of which include but are not limited to horse, rabbit, lamb, cow, sheep, primates, etc.).

In some embodiments, conservation of these components from the porcine esophagus results in the preparation of a heterologous matrix (HM) that is non-immunogenic, and, thus, does not induce an adverse host immune response when it is implanted into a host.

In another embodiment, the inclusion of a mainly intact basement membrane and connective tissue (tunica submucosa) from the porcine esophagus in the present invention, produces a pattern with consistent physical properties.

The invention relates, in one embodiment, to provide defined methods for the use of a membrane suitable for ocular surgical procedures.

The invention relates, in another embodiment, for the human or veterinary use of novel heterologous matrix (HM) for reconstructing damaged ocular surfaces and to promote healing in a variety of injuries or disorders involving the cornea, the conjunctiva, and/or the eyelid, after injury due to trauma, disease, or surgery.

In a specific embodiment, the present disclosure is directed to a new and effective method of repairing a disorder or injury in an eye, in a variety of ophthalmic indications, with biocompatible implant, the mucosa, the basement membrane, and the submucosa of the porcine esophagus.

In another embodiment, the use of HM for tissue repair and regeneration in cases where ocular structures are injured, in one embodiment, by trauma, or in another embodiment, by burns, or extensive injuries.

In one embodiment the heterologous matrix (HM) is preferably administered to a subject for repairing, reconstructing, replacing, or supplementing a recipient's damaged, compromised, or missing ocular tissues.

In another embodiment the heterologous matrix (HM) of the present disclosure can be used to treat any subject in need of treatment, including but not limited to humans, primates, and domestic, farm, pet, or sports animals, such as dogs, horses, cats, sheep, pigs, cattle, rats, mice, and the like.

In some embodiments, such heterologous matrix (HM) enables a surgeon to utilize in a variety of injuries or disorders involving the cornea, the conjunctiva, and/or the eyelid after injury due to trauma, disease, or surgery.

In another embodiment, this invention provides a method of implanting a heterologous matrix (HM) of this invention, in a subject for immediate closure and promote healing in the cornea, conjunctiva and/or eyelid in injuries caused by trauma, disease, or surgery.

Thus, another embodiment of this invention is a method of implanting into the vertebrate the heterologous matrix (HM), prepared as described above comprising mucosa, basement membrane and tunica submucosa of esophagus of warm-blooded vertebrate in an amount effective to promote healing of a variety of ocular surface injuries or disorders at the site of use.

In a specific embodiment, relates to a heterologous matrix (HM) for implantation in space of an eye, for human or veterinary use, a biocompatible heterologous matrix (HM) of porcine esophagus, as a graft (substrate) or as a 'patch' (biological dressing), in direct contact with an ocular surface, for repairing, reconstructing, replacing, or supplementing a recipient's damaged, compromised, or missing ocular tissue.

In a specific embodiment, surgery or other procedures are performed to correct, repair, or ameliorate injuries to the eye.

Continuing the embodiment, the heterologous matrix (HM) can be administered by any suitable technique like for any grafts, and it is important that the graft site is properly prepared by removing loose epithelium and necrotic ocular tissues.

Figure 2:
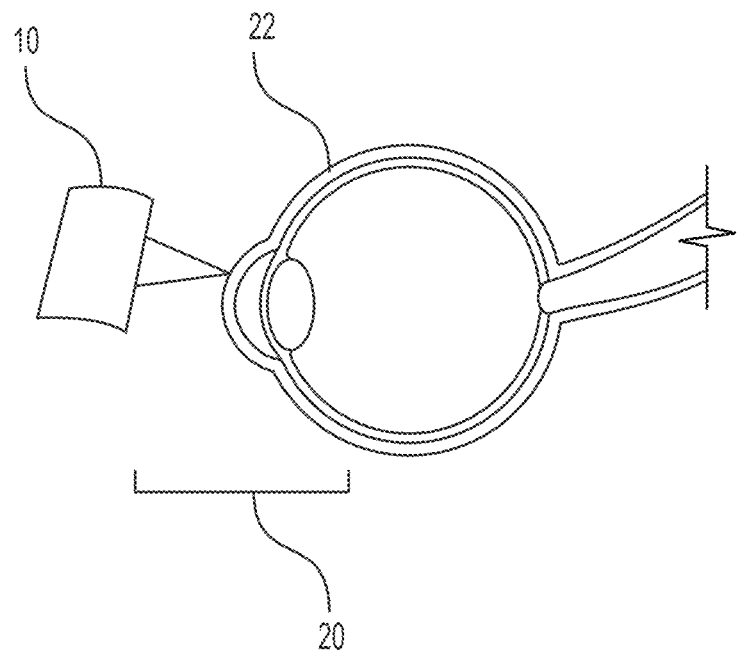
FIG. 2 depicts the application of the heterologous matrix of FIG. 1 to an ocular surface condition.

As illustrated in FIG. 2, the heterologous matrix (HM) (10) covering for a tissue surface, according to an embodiment of the invention, can be placed on a target tissue (22) injured in the ocular region (20).

In one embodiment, a layer of (HM) is generally sufficient, both for superficial use and for deep ulcers that require filling the defect.

In one embodiment, the tissue is cut to the desired size and shape, for the surgical procedure in which the tissue will be used and, if preferred, surgically applied to the desired site using surgical sutures or tissue adhesives, to reduce premature graft retraction and to allow quick graft adherence to the defect site.

In some embodiments, the surgery or other procedure comprises contacting the site of injury with one or more pieces of biomaterial from the mucosa, the basement membrane, and the submucosa of the porcine esophagus, held in place by, e.g., sutures or a tissue adhesive suitable for use in the eye.

In some embodiments, the heterologous matrix (HM) produced and used in accordance with this invention, upon implantation, it can serve as a template to facilitate structural and functional restoration of lost or damaged ocular tissues in warm-blooded vertebrates, including humans.

In one embodiment, the size and form of said biologically active graft is a function of the tissue into which the HM is to be implanted.

In another embodiment, the heterologous matrix is always implanted with the mucosal side outward and the submucosal side in direct contact with the wound bed, both in use as a graft or covering.

In one embodiment, the heterologous matrix (HM) becomes sufficiently adhered to the graft bed so that the graft becomes thoroughly integrated at all levels and facilitate the structural and functional restoration of lost or damaged ocular tissues.

The HM according to an embodiment, can remain in place on the damaged tissue surface for a sufficient period to bring about a noticeable improvement in the condition of the tissue occurs.

In accordance with this embodiment, the heterologous matrix (HM) is used beneficially to induce the formation of stromal-epithelial cells at a desired site in a warm-blooded vertebrate including humans.

In another modality, the use of mucosa, basement membrane and tunica submucosa of porcine esophagus is contemplated, for other treatment methods or applications that have not been discussed in the present application, for example transformation into fine particles, emulsion, gel, extracts, or as a vehicle for cells, in the pursuit to improve, develop or enhance other biotechnological/biological products.

The invention relates, in another embodiment, to provide defined new processes to produce the heterologous matrix (HM) suitable for direct surgical use.

Figure 1B:
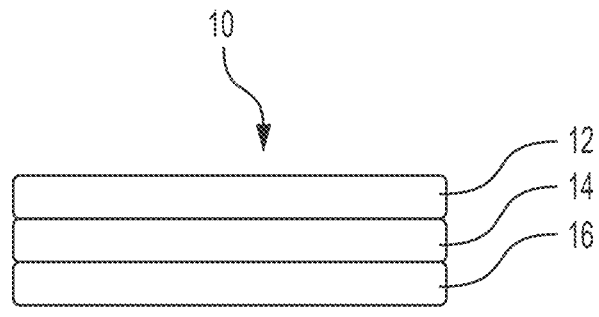

Accordingly, as illustrated in FIGS. 1A and 1B, one embodiment of this invention provides a method for preparing a natural structure (10) comprising non-keratinized stratified squamous epithelium (Mucosa) (12), basement membrane (14) and connective tissue (tunica Submucosa) (16) in its natural sheet forms (Ad integrum) (10) from the porcine esophagus.

Consequently, an embodiment of this invention provides a method to prepare the matrix of the present application, with similar processes of the disclosure of invention presented by the applicant: under the title of Biologically active graft for skin replacement therapy US 2017/0080127 A1, on Mar. 23, 2017, which is incorporated herein by reference in its entirety.

In one embodiment the steps for the preparation of the material are the following sequences, written succinctly in this description, and more detailed explanations regarding each individual step will follow extended in the example number one of the present applications.

In a specific embodiment, only materials from proper suppliers that ensure full traceability should be used.

In another embodiment the heterologous matrix (HM) is obtained from animals that have passed ante mortem and postmortem inspection and meet regulatory requirements under U.S. federal inspection (USDA-FDA).

In another embodiment manufacturer provide a certificate of compliance for every lot of materials, about the quality of tissues removed and their appropriate handling after removal from the animal.

In a specific embodiment, the animal is slaughter and remove the porcine esophagus. In another embodiment this is stored refrigerated or on wet ice in sealed container.

Continuing the embodiment, the material must then be cleaned and separate the mucosa, basement membrane and tunica submucosa, from the tunica muscularis and adventitia of an esophagus of a warm-blooded vertebrate.

In another embodiment the tract is squeezing to force out the mucosal contents and gently run water inside the mucosal surface of the tract, until the inner surface of the tract is clean, to remove any food waste.

In another aspect of the invention, the porcine esophagus tract is cut longitudinally to produce a single flat membrane.

Continuing the embodiment, the esophagus mucosa, basement membrane and tunica submucosa is delaminated from this surface by gentle abrasion manually and/or using moistened gauze.

In another embodiment the tissue is cut into smaller sections approximately 10 cm.

In one embodiment the esophageal tissues are now placed in n-alkyl (50% c14, 40% c12, 5% c16) dimethyl benzyl ammonium chloride for minimum of 6 hours at room temperature (or at 4 C in cooler overnight) or in another embodiment an alternative method involves immersing the tissue source (e. g. by submersing) in 0.1% (v/v) peracetic acid (PAA) and 95.9% (v/v) sterile water for two hours.

Continuing the embodiment following the disinfectant soak, the esophageal tissues is rinse three times for at least 5 minutes, using distilled water.

In another embodiment for sublimation drying (lyophilization) the esophageal tissues is place in the lyophilizing trays in single layer and follow preset lyophilizing program until moisture is removed and desired drying is achieved.

In an embodiment, the esophageal tissues may be perforated by discrete punctures across the entire piece of membrane.

Preferably, the biomaterial used in the methods of the invention is stored in a sterile double peel-pouch package.

In another aspect of the invention, sterilization be accomplished using gas, e.g., ethylene dioxide, and is preferably done using radiation, for example, gamma radiation, or electron beam irradiation using methods known to one skilled in the art.

In some embodiments, a tissue product described herein is stored for later use.

While the compositions and methods of this invention have been described in terms of preferred embodiments, it will be apparent to those of skill in the art that variations may be applied to the methods and in the steps or in the sequence of steps of the methods described herein without departing from the concept, spirit, and scope of the invention.

The following examples are included to demonstrate preferred embodiments of the disclosure.

It should be appreciated by those of skill in the art that the techniques disclosed in the examples which follow represent techniques discovered by the inventor to function well in the practice of the invention, and thus can be considered to constitute preferred modes for its practice.

However, those of skill in the art should, considering the present disclosure, appreciate that many changes can be made in the specific embodiments which are disclosed and still obtain a like or similar result without departing from the spirit and scope of the invention.

While the fundamental novel features of the tissue disclosed herein have been described, it will be understood that various omissions, substitutions and changes in the form and details may be possible without departing from the spirit of the present disclosure.

Example #1

Processes and Method to Modify Naturally Occurring Product of Nature

Part this section of the recognition that the material is created entirely by nature unassisted by man, so that invention can be attributed only to the process and method to modify this natural physical structure and the method of using the same.

A simple standardized and straightforward method it has been developed to fabricate the mucosa, the basement membrane, and the submucosa of the porcine esophagus.

Accordingly, one embodiment of this invention provides a method for preparing a natural matrix comprising non-keratinized stratified squamous epithelium (Mucosa), basement membrane and connective tissue (tunica submucosa) in its natural sheet forms (Ad integrum) from the porcine esophagus.

A detailed look at the history and procedure for harvesting and using the mucosa, the basement membrane, and the submucosa for surgical procedures and processes for their mode of treatment of the material are established in the past in the disclosure of invention of the patent submitted by the applicant under the title of BIOLOGICALLY ACTIVE GRAFT FOR SKIN REPLACEMENT THERAPY US 2017/0080127 A1, on 2017 Mar. 23, in whose description the details of the elaboration of said raw materials were included, in compliance with international quality and safety standards, which are similar to the steps carried out in the preparation of the matrix of the present invention, therefore, the aspects of its elaboration is incorporated herein by reference in its entirety, and the steps of which are detailed in the following pages and corresponding sections of said patent (US 2017/0080127 A): Pages 3 to 4: lines 0077 to 0083, Pages 4 to 5: lines 0098 to 00120, which are quoted literally:

"Product Manufacturing Methods

The preparation of a (BAG) composition from the esophagus of warm-blooded vertebrate in accordance with the invention is carried out by separating the mucosa, basement membrane and tunica Submucosa from the esophagus of warm-blooded vertebrate in a manner that ensures minimal disruption or damage to this natural arrangement.

Conservation of these components from the esophagus of warm-blooded vertebrates' results in the preparation of a (BAG) composition that is non-immunogenic, and, thus, does not induce an adverse host immune response when it is implanted into a host.

The method comprises the steps of delaminating the mucosa, basement membrane and tunica Submucosa from the whole esophagus of warm-blooded vertebrate.

Accordingly, one embodiment of this invention provides a method for preparing a natural cellular/nonliving composition comprising non-keratinized stratified squamous epithelium (Mucosa), basement membrane and connective tissue (tunica Submucosa) in its natural sheet forms (Ad integrum) from the esophagus of a warm-blooded vertebrate.

In another embodiment the mucosa, basement membrane and tunica submucosa for use in the (BAG) composition in accordance with the invention are typically prepared from the esophagus of a warm-blooded vertebrate harvested from animals including, for example, pigs, cattle, sheep or other warm-blooded vertebrates and does not exclude the use of the esophagus of cold-blooded aquatic animals and other marine mammals.

In another embodiment, this invention provides a process for preparing a biocompatible graft composition from the esophagus of warm-blooded vertebrate, and in general, the method for preparing the mucosa, basement membrane and tunica submucosa comprises the steps of obtain freshly harvested esophagus of warm-blooded vertebrate from proper suppliers that ensure full traceability and in a First Process the material is washed in a large volume of circulating water to remove adhering blood and residues of food, followed by immersing in 0.1% (v/v) peracetic acid and 95.9% (v/v) sterile water for two hours.

Then, in a Second Process the operator proceeds to cut the material in the longitudinal axis using surgical instruments, and carefully proceed to separate the adventitia and muscular layers in order to preserve intact the inner structures (mucosa, basement membrane and tunica Submucosa) because they are the primary material of the present invention.

Then the larger pieces of esophagus can be cut in segments 8-10 cm long×5 cm wide. Next, in each segment, the peracetic acid residue is removed by washing twice for 15 minutes with PBS (Buffered saline) (pH-7.4) and twice for 15 minutes with sterile water in order to remove any residual disinfectant-sterilizing agent.

Each tissue should be packaged individually as soon as possible into a vacuum bag (multi-layer synthetic bag). Air is removed from the bag.

Mode for Invention (Method of Making the Biologically Active Graft composition (Description): The biologically active graft (BAG) composition is made from the esophagus of warm blood vertebrates. The esophagus comprises distinct layers.

From the inner to the outside, these are: mucosa, submucosa, muscle, and adventitia. The mucosa and submucosa (include the basement membrane) forms the main foundation in the present invention.

The biologically active graft (BAG) composition is obtained from animals that have passed ante mortem and postmortem inspection and meet regulatory requirements for not poisonous products. Only materials from proper suppliers that ensure full traceability should be used. Manufacturers should provide a certificate of compliance for every lot of materials should take into account the quality of tissues to be removed and their appropriate handling after removal.

Process ONE: Evisceration stages: At the site of animal sacrifice the esophagus was separated from the trachea and lungs to tie it, which allowed the lungs to be removed through the diaphragm without rupturing the esophagus.

This is primarily a hand and/or knife operation. Both the inner and outer layers of the esophagus are carefully removed, and appropriate gloves must be wearing for all procedures.

After harvest the esophagus, should be inspected in relation to the smell, irregularity or abnormality in shape or color and discard the material if any such defect be present.

Them the primary material is transfer torn an area that allows copious amounts of circulating fresh water for cleaning its external and internal Surfaces and mainly run water through the lumen of the esophagus.

Next desirable processes of the invention involve immersing the tissue source (e. g. by submersing) in 0.1% (v/v) peracetic acid and 95.9% (v/v) sterile water for two hours.

Laboratory Working Areas. The laboratory should be kept neat, clean, and free of materials that are not pertinent to the work.

The surfaces of Stainless-steel table should be decontaminated before and after each use and application of pressure with vigorous scrubbing greatly improves the removal of grease and other unwanted contaminants from a preparation surface.

Freshly prepared hypochlorite solutions recommended for decontamination at 1 g/l. All instruments used during the procedure should be sterile and stored on sterile drape.

Process TWO: In the previously disinfected surface of stainless-steel table and covered with a sterile drape, the tissues may be removed from their container and laid upon table, using an aseptic technique with sterile cloths and gloves.

Using surgical scissors or scalpels proceed to cut the material completely in the longitudinal axis, to identify macroscopically the structures that make the composition.

The mucosal layer is found inside the cylindrical tube which in the normal esophagus is recognized for having smooth surface and white color. The material thus obtained was placed over the area to be processed with the mucous plane put downward.

Using Surgical instruments, such as Metzenbaum Scissors or scalpel, carefully proceed to separate the adventitia and muscular layers (which is recognized by its red color) to preserve intact the inner structures because they are the primary material of the present invention.

The mucosa, basement membrane and tunica sub mucosa are separated easily and consistently from the whole esophagus and should be examined to confirm there is minimal tissue debris on its surface.

Larger pieces of esophagus tissues can be reduced in size and cut in segments 8-10 cm long×5 cm wide (this may vary slightly according to the animal that is used as source material).

Next, in each segment, the peracetic acid residue is removed by washing twice for 15 minutes with PBS (Buffered saline) (pH-7.4) and twice for 15 minutes with sterile water to remove any residual disinfectant-sterilizing agent.

Each tissue should be packaged individually as soon as possible packaging into a vacuum bag (multi-layer synthetic bag). Air is removed from the bag by means of the vacuum packaging machine and the bag then is sealed.

Once received, the matrix is lyophilized and then sterilized from the manufacturers, can be stored for as long as 24 months at room temperature and it is easily available at the point of use.

The product is manufactured by a US company which specializes in the supply of various tissues including, bones, veins, corneas, eyes, brain material, joints, organs, glands, skin, blood, tendons, fetal, reproductive, and digestive materials, for research to many medical manufacturing companies and universities throughout the United States.

In the facilities of the company that prepares materials of swine origin, the pig receives ante and post-mortem inspections by the USDA and acceptance with the FDA in accordance with ISO 22442-2:2007 Medical devices utilizing animal tissues and their derivatives—Part 1: Application of risk management Part 2: Controls on sourcing, collection, and handling.

Regulations to the Control of raw materials in the U.S. Code of Federal Regulations (CFR), ICH, and other regulations/guidance's cited below: Regarding 21 CFR 211.110 Control of in-process materials, ICH Q5A/D for cell substrates and viral safety, ICH Q7 discussing the need to check with appropriate materials specifications, ICH Q10 stating that a bio manufacturer is responsible for the quality of purchased materials.

In summary this company meets the following important aspects: adherence to regulations, quality systems emphasis, quality management, monitor/audit of the manufacturing process, aseptic techniques required during production, purity product and process-related impurities, maintenance of equipment, batch production and control records and maintenance of documentation.

Sterilization

The lyophilized products are shipped to a contract sterilizer to terminal sterilization by any suitable medically acceptable method: for example, using gas, e.g., ethylene dioxide, exposed to gamma radiation at 17-30 kGy, or exposed to an electron beam for a period sufficient, to sterilize the tissue product.

This process pursues achieve a Sterility Assurance Level (SAL) sufficient to kill at least 99.9% of bacteria or other potentially contaminating organisms.

Final Inspection

Sterilized product returned from the contract sterilize company, is inspected for shipment and release to the end user. Inspection will include package integrity and final labeling inspection, to name a few.

This final inspection ensure that the product contained therein matches the product specifications and inspected to determine the existence of holes, broken seals, tears, contamination, or other physical defects.

Units passing inspection are released for storage, distribution, and subsequent use. The matrix was now considered transplant ready and stored at ambient temperature conditions."

The only additional step that is included are the micro perforations that are made to the matrix, prior to sterilization, designed to allow free transit of the ocular fluids, necessary to lubricate (tear film) and assist in the repair-regeneration of damaged tissues.

Example No. 2 Heterologous Matrix (HM) Placement Procedure

Preventive aspect: In elective surgery, patients should abstain from taking aspirin for 10-14 days before surgery; alcohol, vitamin E, and NSAIDs for 4-5 days before surgery; and Coumadin for 3-5 days before surgery which may contribute to postoperative hematoma or seroma formation.

The Heterologous matrix (HM) is not suitable for placement onto infected wounds.

The success is dependent on the underlying condition and rigorous case selection is recommended and does not use it in primary cases of pterygium excision.

It is suggested that the specialist value the use of general anesthesia in any complicated intervention or topical anesthesia in the affected eye.

When the HM is used as a 'patch' (biological dressing), it tends to disintegrate within seven to 14 days, making it a temporary bandage.

When used as a graft (substrate) the expectation is that the basement membrane and connective tissue of the matrix will become integrated into the ocular tissues, with subsequent permanence.

Management of the recipient wound bed: this is probably the most important prerequisite for successful grafting of the Heterologous matrix (HM).

It is preferable that the matrix is used after the removal of necrotic and pathological tissues, and when applied it is done on a vascularized receptor site, free of infection and local bleeding.

The matrix requires to be rehydrated before use for 5 minutes in sterile normal saline or Ringer's lactate, and then is cut to the size of the required defect, placing it in any case with the epithelial side outwards (label indicating such orientation on the container).

Pressure on the product to displace the liquids underneath it and bring it closer to the injury.

Fixation of the matrix to the ocular surface in severe injuries is essential to prevent early detachment.

A single sheet may be applied as a graft or patch at least 1 mm larger than the defect and anchored to the ocular tissues with multiple interrupted 10-0 nylon monofilament sutures.

Too many suture ties can incite tissue growth, thereby inducing a granulomatous foreign body reaction and patient discomfort.

An alternative material to use in the conjunctiva is 8-0, 9-0 or 10-0 Vicryl sutures given the rapid healing ability of these tissues, and this is preferred to be placed in children.

Suture less applications with fibrin glue make the procedure easier and more comfortable for the patient, although this method has not been used at the time of the preparation of this patent.

The graft and the dressings can be left in place for extended periods without detrimental effects to the underlying injury.

The basement membrane and connective tissue will be permanently incorporated into the ocular structures of the recipient host.

Complications that the surgeon may encounter further than infection include seroma and/or hematoma formation, and graft contracture. Although wound infection is rare, when this is suspected, appropriate bacterial identification is obligatory and according to the cultivated microorganism's antibiotics should be prescribed.

Example No. 3 Research & Development

This product has been validated in previous studies, where the safety and efficacy has been fully established in more than 1,500 patients (especially children) in skin regeneration in partial-thickness burns, so the background can be assumed a particular mechanism action matching by analogy with repair mechanisms at the level of the ocular surface (biological plausibility).

The investigations carried out by the author with case reports, formal and controlled clinical trials (clinical plausibility), supports the application in the ocular surface injuries, having passed the biological plausibility within the biomedical scientific conceptual framework.

Product available data demonstrate the absence of adverse effects in use (absence of allergic and antigenic response), who's source and manufacturing comply with international standards.

It provides structure for adequate epithelial cells migration and perform a natural guide for tissue repair, because assists the delicate balance of wound healing, manufactured with a small pore to allow interact whit fluid drainage.

Main advantages:—biocompatibility (absence of allergic and antigenic response);—it stimulates the reconstruction of tissue;—easy handling shortens the time required for surgery with consequent improved recovery prospects.

Three clinical trials are presented below, highlighting the above:

Clinical Studies

First Study [104]

Were included in the study, over a period of 12 months (February 1996 to April 1997), 64 patients with burns to a maximum of 32% of total body surface area (TBSA) admitted in the National Hospital of Amatitlán, Guatemala, requiring treatment for burn by scald or flame etiology.

This is a non-randomized, retrospective-prospective comparative study about treatment alternatives: a) silver sulfadiazine b) Amniotic Membrane c) Ixchel I membrane (the matrix of the present application) and d) Ixchel II membranes (Tissue Grafting Method U.S. Pat. No. 9,023,342 B2 Granted 2015 May 5), in four groups of patients with acute superficial partial thickness and mid-partial thickness burns.

Analysis of three variables was done: 1. Patient length of stay (LOS) 2. Number of dressing changes and 3. Aesthetic results.

In the long-term outcome: at 24 weeks were skin appearance and/or the presence of scarring assessed by burn-wound score.

It should be emphasized that many children with minor burns were hospitalized derived from the poor nutritional status and the high incidence of non-accidental burns with suspected mistreatment.

Results

In regarding to the duration of hospitalization there was no statistic difference (p>0.05), with application of the non-parametric Test of Kruskal Wallis with the Gehan statistic.

As for the total number of dressing changes, nine were required for the group of silver sulfadiazine (p<0.05) against two with amniotic membrane and one with membranes Ixchel I (the matrix of the present application) and Ixchel II (Tissue Grafting Method U.S. Pat. No. 9,023,342 B2 Granted 2015 May 5).

The aesthetic results were better and classified as excellent, according to the table of visual valuation, in the following proportion: Ixchel I membranes: 90% (the matrix of the present application); Ixchel II: 70% (Tissue Grafting Method U.S. Pat. No. 9,023,342 B2 Granted 2015 May 5); Amniotic: 56%, and in the group of cream of topical use (SS), no case was found that could be classified as excellent, and only 40% with good results.

No complications related to the Ixchel I (the matrix of the present application) and Ixchel II membranes (Tissue Grafting Method U.S. Pat. No. 9,023,342 B2 Granted 2015 May 5) were observed in patients throughout the study period.

Second Study

Were included in the study, over a period of 6 months from 1 Mar. to 1 Sep. 1998 consecutive burn patients (n=34) of both sexes, with age group between one and sixty years and with an acute superficial partial thickness and mid-partial thickness burns of scald or flame etiology, and a surface area of ≤10% of total body surface area (TBSA)

Principal Results: The average hospital stay of 6.75 days in the group with Ixchel membrane (the matrix of the present application) and 9.11 in EZ Derm™ demonstrated a statistically significant difference (p=0.04) with 95% confidence.

In the group of patients treated with the membrane Ixchel I (the matrix of the present application), in the clinical evaluation at six months' excellent cosmetic results (94%) were obtained, then those obtained with the EZ Derm™ group (61%), with statistically significant difference (chi-square of 4.87 and p=0.042) with 95% confidence.

Skin biopsy and histological examination at the site of the previous burn at six months' post-treatment revealed the following:
  a. Ixchel I treatments (the matrix of the present application): the dermal layer exhibited a dense well-organized collagenous connective tissue material, overlaid with a well-stratified epidermis.
  b. EZ Derm™: the dermal layer exhibited histological pattern of disordered collagen and abundant inflammatory reaction.

In the visual evaluation seven cases of EZ Derm™ treatment group showed a raised area <1 mm in less than 5% extension at the site of the burn, so the results were rated as good according to visual table prepared.

In the treatment group with Ixchel I membrane (the matrix of the present application) the precipitating antibodies, and the immediate and delayed skin test were negative in the 100% of the cases.

No side effects or allergic reactions from local treatment were noted in patients in either group.

The cost of membrane Ixchel I (the matrix of the present application) is 99% lower than EZ Derm™ membrane.[105]

Third Study

This clinical research refers to a descriptive, observational study of a series of cases (uncontrolled longitudinal study), in which the membrane Ixchel I (the matrix of the present application) was applied to 401 patients, in a single center, in the Burn Unit "Rafael Castillo Lara" of the Amatitlán National Hospital of the Government of the Republic of Guatemala, during the period from Jun. 1 of 1997 to Jun. 30 of 2007.

The short-term outcome was Complete Burn-Wound epithelialization, days of hospital stay, number of cures, time to re-epithelialization, and complications such as adverse event (infection and local or systemic reaction).

In the long-term outcome: at 12 months 'were skin appearance and/or the presence of scarring assessed by clinical judgment.

Results

A total of 401 patients were included in the study, 249 males and 152 females.

The injuries occurred in 67% children under 15 years.

Most patients (88%) had between 1 to 10% extents of Total Body Surface Area (TBSA) with burns.

Burns was produced in 60% of cases by direct fire on the skin, in 38% of cases by ashes, and by 1% for each of the agent's: hot oil and gunpowder explosion.

Number of interventions at the Burn-wound site: One intervention in 90% of cases, without dressing changes.

In 67% of cases the burned area exhibited complete epithelialization at seven to ten days, so the patient was discharged on day 10 after burning wound treatment.

Aesthetic results judged excellent in 76% of cases in 305 patients who recovered at the sixth month. 96 patients were not evaluated by loss of follow-up. The length of stay in hospitals was less than 10 days in 60% of cases.[106]

Example No. 4 Clinical Cases

Six representative patients with different ocular surface lesions related to severe ocular surface diseases were selected to evaluate the application and efficacy of these new techniques in detail. Their clinical characteristics are summarized below.

Patient follow-up examinations were performed 7, 14, 21 and 45 days after surgery. This included an assessment of symptoms such as pain, photophobia, and inflammation.

Intraocular pressure and visual acuity were also measured, and re-epithelialization was assessed by fluorescein staining.

Standard photography and slit lamp bio microscopy were used to evaluate the regeneration of the compromised eye tissues.

The clinical outcome for all cases was established with 45 days of postoperative follow-up.

In general, success was determined based on the scope of surgery and the presence of one or a combination of the following criteria: resolution of inflammation, relief of symptoms, restoration of regular and stable corneal and conjunctival epithelium, and restoration of the structural integrity of the eye.

Partial success was defined as attainment of only two of the above criteria. Failure was defined as the absence of all the above criteria.

The procedure was able to promote re-epithelialization in most of the patients and the restoration of a stable conjunctival and in some cases corneal epithelium.

Only the case #1 was considered a partial success because he developed recurrent tissue inflammation problems and delay epithelization probably derived from the chemical injury.

CASE 1 20 years-old, male
TYPE OF INJURY* Symblepharon secondary to caustic soda burn (Sodium hydroxide).
* (Total or partial adhesion between the inner face of the eyelid and the eyeball.)
EVOLUTION TIME 1 year. AFFECTED EYE left
TYPE OF SURGERY PERFORMED Symblepharon resection, the HM is sutured to the conjunctiva around the defect.
EVOLUTION OF DAY 7 The sutures are removed, the HM is not present, there are still corneal and conjunctival areas (less than 50%) pending epithelialization, there are no signs of infection, there is no secretion
EVOLUTION OF DAY 14 Presence of a conjunctival pyogenic granuloma* in the treated area, 100% epithelialization in the conjunctiva and cornea, there is no secretion and there are no signs of infection. * (Fibrovascular inflammatory reaction secondary to an inflammatory process)
EVOLUTION OF DAY 21 Granuloma responds favorably to an increase in the dose of steroids, decreasing its size.
TOTAL RECOVERY TIME 45 days
RESULT Marked improvement, regression of the Symblepharon in a very low and non-limiting degree.
CASE #2 AGE 58 years SEX Female
TYPE OF INJURY Symblepharon+recurrent pterygium secondary to previous resection of pterygium (on 3 occasions)
EVOLUTION TIME 3 years AFFECTED EYE right
TYPE OF SURGERY PERFORMED Resection of Symblepharon and pterygium, the HM is sutured to the conjunctiva around the defect.
EVOLUTION OF DAY 7 The HM is still present, so it is decided not to remove the sutures until the next appointment, vascular growth is observed under the BE in the conjunctiva, there is still 25% de-epithelialized corneal surface, there are no signs of infection or severe inflammation.
EVOLUTION OF DAY 14 Patient does not attend appointment due to transportation problems.
EVOLUTION OF DAY 21 The HM is not observed, the sutures are removed, the corneal surface is epithelialized in 100% and the conjunctival in 75%, there are no signs of severe infection or inflammation, no signs of regression of the symblepharon are observed
TOTAL RECOVERY TIME 43 days
RESULT Total resolution of the initial pathology
CASE #3
AGE 52 years SEX Female.
TYPE OF INJURY Symblepharon +recurrent pterygium secondary to previous resection of pterygium.
EVOLUTION TIME 8 years AFFECTED EYE left
TYPE OF SURGERY PERFORMED Resection of Symblepharon and pterygium, the HM is sutured to the conjunctiva around the defect
EVOLUTION OF DAY 7 The HM is still present, so it is decided not to remove the sutures until the next appointment, vascular growth is observed under the HM in the conjunctiva, there is still 20% de-epithelialized corneal surface, there are no signs of infection or severe inflammation
EVOLUTION OF DAY 14 Sutures are removed, the HM is fully adhered to the ocular surface, the cornea is 100% epithelialized and there is vascular tissue under the HM in 85% of it, there are no signs of infection or severe inflammation
EVOLUTION OF DAY 21 The HM is not observed, the entire ocular surface is 100% epithelialized, there are no signs of infection or severe inflammation, there is no regression of the symblepharon
TOTAL RECOVERY TIME 32 days
RESULT Total resolution of the initial pathology.
CASE #4
AGE 67 Years SEX Female
TYPE OF INJURY Defect in orbital socket secondary to implant extrusion (History of evisceration 5 years ago).
EVOLUTION TIME 1 month AFFECTED EYE left
TYPE OF SURGERY PERFORMED Placement of fatty tissue graft to replace the implant covered with the HM fixed to the conjunctiva of the basin with sutures.
EVOLUTION OF DAY 7 The HM has begun to disintegrate but the fatty graft is attached to the basin because its base is vascularized, we proceed to remove 50% of the sutures that no longer hold the HM by lysis of the same.
EVOLUTION OF DAY 14 All the sutures are removed since the HM has been completely lysed but the fatty tissue graft is incorporated into the orbital basin and the conjunctivalization process has started on it by 40%.
EVOLUTION OF DAY 21 The fat graft remains fully incorporated into the basin and presents a conjunctivalization in 75% of its surface, there are no exudates or signs of infection or severe inflammation
TOTAL RECOVERY TIME 45 days
RESULT Total resolution of the initial defect
CASE #5
AGE 61 years SEX Female
TYPE OF INJURY Symblepharon+recurrent pterygium secondary to previous resection of pterygium (on 2 occasions)
EVOLUTION TIME 2 years EYE AFFECTED Right TYPE OF SURGERY PERFORMED Resection of Symblepharon and pterygium, the HM is sutured to the conjunctiva around the defect EVOLUTION OF DAY 7 The HM is still present, so it is decided not to remove the sutures until the next appointment, vascular growth is observed under the HM in the conjunctiva, there is still 30% de-epithelialized corneal surface, there are no signs of infection or severe inflammation.

EVOLUTION OF DAY 14 The HM is not observed, the sutures are removed, the corneal surface is epithelialized in 100% and the conjunctival in 70%, there are no signs of severe infection or inflammation, no sign of regression of the symblepharon is observed.

EVOLUTION OF DAY 21 Due to government restrictions secondary to the pandemic, the patient does not have transportation to go to her appointment, and lost contact with the patient.

TOTAL RECOVERY TIME UNKNOWN RESULT Waiting for patient information

CASE #6

AGE 26 years SEX Female

TYPE OF INJURY Thinning of the tissue of the orbital socket surrounding the implant secondary to recurrent infections (history of enucleation 8 years ago).

EVOLUTION TIME 4 months EYE AFFECTED Right

TYPE OF SURGERY PERFORMED Reinforcement of the wall of the anterior orbital socket that surrounds the implant with the HM between the Tenon capsule and the conjunctiva, suturing to it at the edges of the incision but the edges of the wound are not confronted to force fibrosis of the area.

EVOLUTION OF DAY 7 For personal reasons the patient does not attend her appointment EVOLUTION OF DAY 14 The absorbable sutures are still present and the HM has begun to disintegrate, but the granulation process of the defect that had been left between the 2 edges of the incision for closure by second intention granulation has started in 60%, not there are signs of infection or severe inflammation.

EVOLUTION OF DAY 21 Total closure of the wound, slight conjunctival hyperemia, it is no longer possible to see the orbital implant through the socket.

TOTAL RECOVERY TIME 21 days

RESULT Total resolution of the initial condition.

Acknowledgment: Is appreciated the active participation of the Ophthalmologist Yesica Fidelina Rabanales Gomez, in the specialized management of the clinical cases presented above.

Example No. 5 Determination of Humoral Immune Response in Graft Recipients

Forty patients 30 days after treatment were tested for a humoral immune response to a BAG graft component (the matrix of the present application) by mean to precipitation antibodies and skin test evaluation. The precipitating antibodies were tested by immunodiffusion in agar gel and skin test were done by intradermic application of 0.02 ml and evaluated at 10 minutes and at 48 hours. The antigens were obtained by aqueous extracts in P.B.S. (Phosphate buffered saline) with pH 7.2. The precipitating antibodies, the immediate and delayed skin test were negative in the 100% of the cases. This study was conducted by the Dr. Roberto Maselli, Professor of Immunology of the Faculty of Medical Sciences (University of San Carlos of Guatemala) specialized in the University of Colorado, USA

INDUSTRIAL APPLICABILITY

This invention provides a proven technology to produce a non-immunogenic tissue graft compositions comprising porcine esophagus mucosa, basement membrane and tunica submucosa of porcine esophagus.

With the increasing rate of ophthalmic disorders worldwide, advanced ophthalmic materials are needed, whose simplicity (single source material) and speed of manufacturing on an industrial scale in less time, eliminates the long manufacturing period and excessive costs of other materials that are destined to the same use.

Derived from the properties, benefits and studies carried out, exposed previously, it can be summarized that the product is suitable and effective, it meets specifications of quality, reliability, durability, with a range of innovative possibilities for the reconstruction of the damaged ocular surface.

From the patient's perspective, it is necessary to highlight that the quality of life that depends on visual functions, and the use of the matrix can avoid the use of own autografts, if a transplant is necessary.

The matrix has gained wide interest in the ophthalmic professionals of the country, due to its clinical efficacy, simplicity, and affordability for various ocular applications.

From the perspective of industrial application, it is necessary to highlight the global development in ocular diseases, so the safety and efficacy demonstrated by the matrix of this research will facilitate those ophthalmologists quickly adopt it in their therapeutic armamentarium.

The need for collaborative research actions between academia and industry is recognized, to satisfy the unmet priorities in pediatric ophthalmology, which will be facilitated by the optimal experiences presented, in which about 65% of the patients who have received the transplant into the skin (clinical plausibility), they have been children.

A major challenge today is that new drugs are not accessible to all patients in need of medical care in developing countries, so the present solution offers great hope as a low-cost alternative.

The author strongly believes that the widespread use of the implant will contribute to the optimal resolution of complicated ocular surface pathologies in the ophthalmic community, proactively addressing the needs of marginalized and vulnerable groups through targeted interventions.

For developing countries, concerns about "access" to technology need to be considered, and the present invention addresses this need and solves a significant problem for less developed areas of the world with an affordable product.

PATENT CITATION

| Publication number | Priority date | Publication date | Assignee | Title |
| --- | --- | --- | --- | --- |
| U.S. Pat. No. 4,772,283A | 16 May 1986 | 20 Sep. 1988 | White Thomas C | Corneal implant |
| U.S. Pat. No. 4,902,508A | 11 Jul. 1988 | 20 Feb. 1990 | Purdue Research Foundation | Purdue Research Foundation |

-continued

| Publication number | Priority date | Publication date | Assignee | Title |
|---|---|---|---|---|
| U.S. Pat. No. 5,755,791A | 5 Apr. 1996 | 26 May 1998 | Purdue Research Foundation | Perforated submucosal tissue graft constructs |
| WO2005002601A1 | 25 Jun. 2003 | 13 Jan. 2005 | Badylak Stephen F | Conditioned matrix compositions for tissue restoration |
| WO2007084278A2 | 6 Jan. 2006 | 26 Jul. 2007 | University Of Pittsburgh-Of the Commonwealth System of Higher Education | Extracellular matrix based gastroesophageal junction reinforcement device |
| US20080046070A1 | 31 Mar. 2006 | 21 Feb. 2008 | Obermiller F J | Chemically treated extracellular matrices for affecting the cellular response |
| WO2010037092A1 | 29 Sep. 2008 | 1 Apr. 2010 | University Of Pittsburgh-Of the Commonwealth System of Higher Education | Self-regulating device for modulating inflammation |
| US20100135964A1 | 2007 Sep. 27 | 3 Jun. 2010 | Alvarado Carlos A | Tissue grafting method |
| US20100198348A1 | 30 Jan. 2009 | 5 Aug. 2010 | Hiles Michael C | Biomaterials with modified optical character and methods for preparing and using same |
| US20100198348A1 | 30 Jan. 2009 | 5 Aug. 2010 | Hiles Michael C | Biomaterials with modified optical character and methods for preparing and using same |
| AU2006247317B2 | 2005 May 16 | 5 Apr. 2012 | Purdue Research Foundation | Engineered extracellular matrices |
| CA2536923C | 4 Sep. 2003 | 9 Oct. 2012 | Cook Biotech Incorporated | Extracellular matrix composite materials, and manufacture and use thereof |
| WO2013102810A2 | 4 Jan. 2012 | 11 Jul. 2013 | Alvarado Carlos A | Biologically active graft for skin replacement therapy |
| U.S. Pat. No. 8,802,436,B1 | 8 Feb. 2013 | 12 Aug. 2014 | Acell, Inc. | Methods of manufacturing bioactive gels from extracellula matrix material |
| EP1926459B1 | 19 Sep. 2005 | 7 Jan. 2015 | Histogenics Corporation | Cell-support matrix having narrowly defined uniformly vertically and non-randomly organized porosity and pore density and a method for preparation thereof |
| U.S. Pat. No. 9,023,342B2 | 27 Sep. 2007 | 5 May 2015 | Carlos A. Alvarado | Tissue grafting method |
| U.S. Pat. No. 9,089,523B2 | 28 Jul. 2011 | 28 Jul. 2015 | Lifecell Corporation | Natural tissue scaffolds as tissue fillers |
| EP2404572B1 | 4 Mar. 2009 | 6 Jan. 2016 | Won-Ryang et al. | Method for processing porcine cornea for decellularization |
| U.S. Pat. No. 9,238,090B1 | 24 Dec. 2014 | 19 Jan. 2016 | Fettech, LLC | Tissue-based compositions |
| US20160089477A1 | 25 Sep. 2014 | 31 Mar. 2016 | Acell, Inc. | Porous foams derived from extracellular matrix, porous foam ecm medical devices, and methods of use and making thereof |
| U.S. Pat. No. 9,375,513B2 | 14 Apr. 2011 | 28 Jun. 2016 | Lifecell Corporation | Regenerative materials |
| U.S. Pat. No. 9,421,307B2 | 17 Aug. 2010 | 23 Aug. 2016 | University Of Pittsburgh-Of the Commonwealth System of Higher Education | Biohybrid composite scaffold |
| U.S. Pat. No. 9,480,549B2 | 25 Apr. 2008 | 1 Nov. 2016 | Allosource | Multi-layer tissue patches |
| CA2684040C | 12 Apr. 2007 | 6 Dec. 2016 | Isto Technologies, Inc. | Method of forming an implant using a mold that mimics the shape of the tissue defect site and implant formed therefrom |
| WO2017049167A1 | 18 Sep. 2015 | 23 Mar. 2017 | University Of Pittsburgh-Of the Commonwealth System of Higher Education | Non-gelling soluble extracellular matrix with biological activity |
| EP2031968B1 | 2006 Apr. 21 | 22 Nov. 2017 | Wake Forest University Health Sciences | Structurally modified acellular tissue engineering scaffolds and methods of production |
| WO2018007849A1 | 5 Jul. 2016 | 11 Jan. 2018 | Carlos Alvarado | Serous membrane for ocular surface disorders |
| U.S. Pat. No. 10,092,678B2 | 22 Dec. 1999 | 9 Oct. 2018 | Alan R. Spievack | Extracellular matrix for the treatment of intestinal disease and methods thereof |
| CA3060956A1 | 5 May 2017 | 8 Nov. 2018 | University Of Pittsburgh-Of the Commonwealth System of Higher Education | Ocular applications of matrix bound vesicles (mbvs) |
| WO2020186082A1 | 13 Mar. 2019 | 17 Sep. 2020 | University Of Pittsburgh-Of the Commonwealth System of Higher Education | Acoustic extracellular matrix hydrogels and their use |

| Publication number | Priority date | Publication date | Assignee | Title |
| --- | --- | --- | --- | --- |
| CN113226387A | 19 Nov. 2018 | 6 Aug. 2021 | 美国政府(由卫生和人类服务部的部长所代表) | Biodegradable tissue replacement implants and uses thereof |

NON-PATENT LITERATURE

[1] Gipson I. K. (2007). The ocular surface: the challenge to enable and protect vision: the Friedenwald lecture. Investigative ophthalmology & visual science, 48(10), 4390-4398. https://doi.org/10.1167/iovs.07-0770

[2] Weisenthal R W, Afshari N A, Bouchard C S, et al. Chapter 1: Structure and Function of the External Eye and Cornea. In: External Disease and Cornea. American Academy of Ophthalmology. 2013:3-4.

[3] Fernández, A., Moreno, J., Prósper, F., García, M., & Echeveste, J. (2008). Regeneración de la superficie ocular: stem cells/células madre y técnicas reconstructivas. Anales del Sistema Sanitario de Navarra, 31(1), 53-69. Recuperado en 21 de septiembre de 2021, de http://scielo.isciii.es/scielo.php?script=sci_arttext&pid=S1137-66272008000100005&lng=es&tlng=es.

[4] Chapter 1 and 2: Basic structure and function of the human cornea and adnexal structures, corneal embryology. In: Copeland and Afshari's Principles and Practice of Cornea. Vol. 1. 1st ed. New Delhi: Jaypee Brothers Medical Publishers; 2013. pp. 3-18.

[5] Rosellini A, Papini S, Giannarini C, Nardi M, Revoltella R P. Human conjunctival epithelial precursor cells and their progeny in 3D organotypic culture. Int J Dev Biol. 2007; 51(8):739-43.

[6] I-Lun Tsai, Chih-Chien Hsu, Kuo-Hsuan Hung, Chi-Wen Chang, Yung-Hsin Cheng, Applications of biomaterials in corneal wound healing, Journal of the Chinese Medical Association, Volume 78, Issue 4, 2015, Pages 212-217, ISSN 1726-4901, https://doi.org/10.1016/j.jcma.2014.09.011.

[7] Qi H, Zheng X, Yuan X, Pflugfelder S C, Li D Q. Potential localization of putative stem/progenitor cells in human bulbar conjunctival epithelium. J Cell Physiol. 2010 October; 225(1):180-5.

[8] Sangwan V S, Tseng S C. New perspectives in ocular surface disorders. An integrated approach for diagnosis and management. Indian J Ophthalmol. 2001 September; 49(3):153-68. PMID: 15887723.

[9] Ramos T, Scott D, Ahmad S, "An Update on Ocular Surface Epithelial Stem Cells: Cornea and Conjunctiva", Stem Cells International, vol. 2015, Article ID 601731, 7 pages, 2015. https://doi.org/10.1155/2015/601731

[10] Ziaei M, Greene C, Green C R. Wound healing in the eye: Therapeutic prospects. Adv Drug Deliv Rev. 2018 Feb. 15; 126:162-176. doi: 10.1016/j.addr.2018.01.006. Epub 2018 Jan. 31. PMID: 29355667.

[11] Soleimani, M., & Naderan, M. (2020). Management Strategies of Ocular Chemical Burns: Current Perspectives. Clinical ophthalmology (Auckland, N. Z.), 14, 2687-2699. https://doi.org/10.2147/OPTH.S235873

[12] Hancox Z†, Saeed Heidari S K†, Yousaf S†, Saeinasab M, Shahbazi M A, and Sefat F. The progress in corneal translational medicine DOI: 10.1039/D0BM01209B (Review Article) Biomater. Sci., 2020, 8, 6469-6504

[13] Chen, S., Mienaltowski, M. J., & Birk, D. E. (2015). Regulation of corneal stroma extracellular matrix assembly. Experimental eye research, 133, 69-80. https://doi.org/10.1016/j.exer.2014.08.001

[14] Hao Y, Ma D H, Hwang D G, Kim W S, Zhang F. Identification of antiangiogenic and anti-inflammatory proteins in human amniotic membrane. Cornea. 2000; 19(3):348e52. doi: 10.1097/00003226-200005000-00018

[15] Rosellini A, Papini S, Giannarini C, Nardi M, Revoltella R P. Human conjunctival epithelial precursor cells and their progeny in 3D organotypic culture. Int J Dev Biol. 2007; 51(8):739-43.

[16] Kolli, S. Ahmad, H. S. Mudhar, A. Meeny, M. Lako, and F. C. Figueiredo, "Successful application of ex vivo expanded human autologous oral mucosal epithelium for the treatment of total bilateral limbal stem cell deficiency," Stem Cells, vol. 32, no. 8, pp. 2135-2146, 2014.

[17] I-Lun Tsai, Chih-Chien Hsu, Kuo-Hsuan Hung, Chi-Wen Chang, Yung-Hsin Cheng, Applications of biomaterials in corneal wound healing, Journal of the Chinese Medical Association, Volume 78, Issue 4, 2015, Pages 212-217, ISSN 1726-4901, https://doi.org/10.1016/j.jcma.2014.09.011.

[18] De Pascalis, C., & Etienne-Manneville, S. (2017). Single and collective cell migration: the mechanics of adhesions. Molecular biology of the cell, 28(14), 1833-1846. https://doi.org/10.1091/mbc.E17-03-0134

[19] Ocular surface Center Berlin. (s.f.). The eyeball with the cornea and sclera. https://oscb-berlin.org/deeper-insight-into-the-cornea

[20] Bissell M J, Hall H G, Parry G. How does the extracellular matrix direct gene expression? J Theor Biol. 1982 Nov. 7; 99(1):31-68.

[21] Ingber D. Review Extracellular matrix and cell shape: potential control points for inhibition of angiogenesis. J Cell Biochem. 1991 November; 47(3):236-41.

[22] Alberts B, Johnson A, Lewis J, et al. Molecular Biology of the Cell. 4th edition. New York: Garland Science; 2002. The Extracellular Matrix of Animals. Available from: https://www.ncbi.nlm.nih.gov/books/NBK26810/

[23] Li L, Xie T. Review Stem cell niche: structure and function. Annu Rev Cell Dev Biol. 2005; 21( ):605-31.

[24] Chan, B. P., & Leong, K. W. (2008). Scaffolding in tissue engineering: general approaches and tissue-specific considerations. European spine journal: official publication of the European Spine Society, the European Spinal Deformity Society, and the European Section of the Cervical Spine Research Society, 17 Suppl 4(Suppl 4), 467-479. https://doi.org/10.1007/s00586-008-0745-3

[25] Daley W P, Peters S B, Larsen M. Extracellular matrix dynamics in development and regenerative medicine. J Cell Sci. 2008 Feb. 1; 121(Pt 3):255-64. doi: 10.1242/jcs.006064. PMID: 18216330.

[26] Hynes R O. Review The extracellular matrix: not just pretty fibrils. Science. 2009 Nov. 27; 326(5957):1216-9.

[27] Reilly G C, Engler A J. Review Intrinsic extracellular matrix properties regulate stem cell differentiation. J Biomech. 2010 Jan. 5; 43(1):55-62.

[28] Votteler M, Kluger P J, Walles H, Schenke-Layland K. Review Stem cell microenvironments—unveiling the secret of how stem cell fate is defined. Macromol Biosci. 2010 Nov. 10; 10(11):1302-15.

[29] Egeblad M, Rasch M G, Weaver V M. Review Dynamic interplay between the collagen scaffold and tumor evolution. Curr Opin Cell Biol. 2010 October; 22(5):697-706.

[30] Lu, P., Takai, K., Weaver, V. M., & Werb, Z. (2011). Extracellular matrix degradation and remodeling in development and disease. Cold Spring Harbor perspectives in biology, 3(12), a005058.

[31] Lu P, Takai K, Weaver V M, Werb Z. Review Extracellular matrix degradation and remodeling in development and disease. Cold Spring Harb Perspect Biol. 2011 Dec. 1; 3(12).

[32] Hynes R O, Naba A. Review Overview of the matrisome—an inventory of extracellular matrix constituents and functions. Cold Spring Harb Perspect Biol. 2012 Jan. 1; 4(1): a004903.

[33] Bonnans, C., Chou, J., & Werb, Z. (2014). Remodelling the extracellular matrix in development and disease. Nature reviews. Molecular cell biology, 15(12), 786-801. https://doi.org/10.1038/nrm3904

[34] Brown, B. N., & Badylak, S. F. (2014). Extracellular matrix as an inductive scaffold for functional tissue reconstruction. Translational research: the journal of laboratory and clinical medicine, 163(4), 268-285. https://doi.org/10.1016/j.trsl.2013.11.003

[35] Eweida A. M., Marei M. K., "Naturally Occurring Extracellular Matrix Scaffolds for Dermal Regeneration: Do They Really Need Cells?", BioMed Research International, vol. 2015, Article ID 839694, 9 pages, 2015. https://doi.org/10.1155/2015/839694

[36] Kweon S, Song K H, Park H, Choi J, Doh J. Dynamic micropatterning of cells on nanostructured surfaces using a cell-friendly photoresist. ACS Appl Mater Interfaces. 2016; 8:4266-74.

[37] De Pascalis, C., & Etienne-Manneville, S. (2017). Single and collective cell migration: the mechanics of adhesions. Molecular biology of the cell, 28(14), 1833-1846. https://doi.org/10.1091/mbc.E17-03-0134

[38] Chen G, Kawazoe N. Biomimetic Extracellular Matrices and Scaffolds Prepared from Cultured Cells. Adv Exp Med Biol. 2018; 1078:465-474. doi: 10.1007/978-981-13-0950-2_24. PMID: 30357638.

[39] Leong M, Murphy K D, Phillips L G., in Sabiston's Textbook of Surgery: The Biological Basis of Modern Surgical Practice. Chapter: Wound Healing. Editors: Townsend C M, Jr., Beauchamp D, Evers B M, and Mattox K L. Elsevier. Edition 20th.

[40] Makuloluwa A K, Hamill K J, Rauz S, Bosworth L, Haneef A, Romano V, Williams R L, Dartt D A, Kaye S B. The conjunctival extracellular matrix, related disorders, and development of substrates for conjunctival restoration. Ocul Surf. 2021 Jun. 5: S1542-0124(21) 00050-1. doi: 10.1016/j.jtos.2021.05.011. Epub ahead of print. PMID: 34102309.

[41] Rusenko K W, Gammon W R, Fine J D, Briggaman R A. The carboxyl-terminal domain of type VII collagen is present at the basement membrane in recessive dystrophic epidermolysis bullosa. Znvest Dermatol 1989; 92: 623-627.

[42] Furthmayr H. Basement membrane. In: Clark R A F, Henson D M (eds) The Molecular ad Cellular Biology of Wound Repair. New York: Plenum, 1988; pp 525-558.

[43] Watt F M, Seery J P. 2000. Asymmetric stem-cell divisions define the architecture of human oesophageal epithelium. Curr Biol 10(22): 1447-1450.

[44] Yurchenco P. D. (2011). Basement membranes: cell scaffoldings and signaling platforms. Cold Spring Harbor perspectives in biology, 3(2), a004911. https://doi.org/10.1101/cshperspect.a004911

[45] Doxzen K, Vedula S R K, Leong M C, Hirata H, Gov N S, Kabla A J, Ladoux B, Lim C T. Guidance of cell migration by substrate dimension. Biophys J. 2013; 104: 313-321.

[46] Causa F, Netti P A, Ambrosio L. A multi-functional scaffold for tissue regeneration: the need to engineer a tissue analogue. Biomaterials. 2007 December; 28(34): 5093-9. doi: 10.1016/j.biomaterials.2007.07.030. Epub 2007 Aug. 6. PMID: 17675151.

[47] Chan, B. P., & Leong, K. W. (2008). Scaffolding in tissue engineering: general approaches and tissue-specific considerations. European spine journal: official publication of the European Spine Society, the European Spinal Deformity Society, and the European Section of the Cervical Spine Research Society, 17 Suppl 4(Suppl 4), 467-479. https://doi.org/10.1007/s00586-008-0745-3

[48] Freed L E, Vunjaknovakovic G, Biron R J, Eagles D B, Lesnoy D C, Barlow S K, Langer R. 1994. Biodegradable polymer scaffolds for tissue engineering. Biotechnology (NY) 12(7): 689-693.

[49] Mooney D J, McNamara D, Hern D, Vacanti J P, Langer R. 1996. Stabilized polyglycolic acid-fibre based tubes for tissue engineering. Biomaterials 17(2): 115-124.

[50] Negut, I., Dorcioman, G., & Grumezescu, V. (2020). Scaffolds for Wound Healing Applications. Polymers, 12(9), 2010. https://doi.org/10.3390/polym12092010

[51] Q.-M. Jin, H. Takita, T. Kohgo et al., "Effects of geometry of hydroxyapatite as a cell substratum in BMP-induced ectopic bone formation," Journal of Biomedical Materials Research, vol. 52, no. 4, pp. 841-851, 2000.

[52] Zeltinger J, Sherwood J K, Graham D A, Mueller R, Griffith L G. 2001. Effect of pore size and void fraction on cellular adhesion, proliferation, and matrix deposition. Tissue Eng 7(5): 557-572.

[53] Vassilis K, David K. 2005. Porosity of 3D biomaterial scaffolds and osteogenesis. Biomaterials 26(27): 5474-5491.

[54] Salerno A. Di Maio E. Iannace S. Netti P. Tailoring the pore structure of PCL scaffolds for tissue engineering prepared via gas foaming of multi-phase blends. J Porous Mater. 2012; 19:181.

[55] Tan J Y, Chua C K, Leong K F, Chian K S, Leong W S, & Tan L P (2012). Esophageal tissue engineering: An in-depth review on scaffold design. Biotechnology and Bioengineering, 109(1), 1-15. 10.1002/bit.23323

[56] Bružauskaitė, I., Bironaitė, D., Bagdonas, E., & Bernotienė, E. (2016). Scaffolds and cells for tissue regeneration: different scaffold pore sizes-different cell effects. Cytotechnology, 68(3), 355-369. https://doi.org/10.1007/s10616-015-9895-4

[57] Zhu Y., Mi Zhou and Ruixia Hou (Dec. 6, 2017). Tissue Engineering of Esophagus, Esophageal Abnormalities, Jianyuan Chai, IntechOpen, DOI: 10.5772/intechopen.69350. Available from: https://www.intechopen.com/chapters/55818

[58] Goldman J N, Dohlman C H, Kravitt B A. The basement membrane of the human cornea in recurrent epithelial erosion syndrome. Trans Am Acad Ophthalmol Otolaryngol. 1969 May-June; 73(3):471-81. PMID: 5306027.

[59] Nikolova, M. P., & Chavali, M. S. (2019). Recent advances in biomaterials for 3D scaffolds: A review. Bioactive materials, 4, 271-292. https://doi.org/10.1016/j.bioactmat.2019.10.005

[60] Daley W P, Peters S B, Larsen M. Review Extracellular matrix dynamics in development and regenerative medicine. J Cell Sci. 2008 Feb. 1; 121(Pt 3):255-64.

[61] Cawston T E, Young D A.Review Proteinases involved in matrix turnover during cartilage and bone breakdown. Cell Tissue Res. 2010 January; 339(1):221-35.

[62] Brown B N, Badylak S F. Extracellular matrix as an inductive scaffold for functional tissue reconstruction. Transl Res. 2014 April; 163(4):268-85. doi: 10.1016/j.trsl.2013.11.003. Epub 2013 Nov. 8. PMID: 24291155; PMCID: PMC4203714.

[63] Lu, P., Takai, K., Weaver, V. M., & Werb, Z. (2011). Extracellular matrix degradation and remodeling in development and disease. Cold Spring Harbor perspectives in biology, 3(12), a005058.

[64] Bonnans, C., Chou, J., & Werb, Z. (2014). Remodelling the extracellular matrix in development and disease. Nature reviews. Molecular cell biology, 15(12), 786-801. https://doi.org/10.1038/nrm3904

[65] Klenkler B, Sheardown H, Jones L. Growth factors in the tear film: role in tissue maintenance, wound healing, and ocular pathology. Ocul Surf. 2007 July; 5(3):228-39. doi: 10.1016/s1542-0124(12) 70613-4. PMID: 17660896.

[66] Kuhn, L. T.,6—BIOMATERIALS, Editor(s): John D. Enderle, Susan M. Blanchard, Joseph D. Bronzino, In Biomedical Engineering, Introduction to Biomedical Engineering (Second Edition), Academic Press, 2005, Pages 255-312, ISBN 9780122386626,

[67] Williams D F. 2008 On the mechanisms of biocompatibility. Biomaterials. 29 2941 2953 0142-9612

[68] Le Duc P, Wang Y. (2006). Protein adsortion at biomaterial-tissue interface. In An Introduction to Biomaterials, Edited Guelcher S A and Hollinger J O. Biomedical Materials Series. C R C Taylor &Francis Group 47

[69] De Pascalis, C., & Etienne-Manneville, S. (2017). Single and collective cell migration: the mechanics of adhesions. Molecular biology of the cell, 28(14), 1833-1846. https://doi.org/10.1091/mbc.E17-03-0134

[70] Williams D F. Review On the nature of biomaterials. Biomaterials. 2009 October; 30(30):5897-909.

[71] Vishwakarma A, Bhise N S, Evangelista M B, Rouwkema J, Dokmeci M R, Ghaemmaghami A M, Vrana N E, Khademhosseini A. Review Engineering Immunomodulatory Biomaterials to Tune the Inflammatory Response. Trends Biotechnol. 2016 June; 34(6):470-482.

[72] Rowley A T, Nagalla R R, Wang S W, Liu W F. Review Extracellular Matrix-Based Strategies for Immunomodulatory Biomaterials Engineering. Adv Healthc Mater. 2019 April; 8(8): e1801578.

[73] Ahearne, M., Fernández-Pérez, J., Masterton, S., Madden, P. W., Bhattacharjee, P., Designing Scaffolds for Corneal Regeneration. Adv. Funct. Mater. 2020, 30, 1908996. https://doi.org/10.1002/adfm.201908996

[74] Espana E. M., S. Shah, M. R. Santhiago, A. D. Singh. Graft versus host disease: clinical evaluation, diagnosis, and management. Graefes Arch Clin Exp Ophthalmol, 251 (2013), pp. 1257-1266

[75] Malhotra, C., & Jain, A. K. (2014). Human amniotic membrane transplantation: Different modalities of its use in ophthalmology. World journal of transplantation, 4(2), 111-121. https://doi.org/10.5500/wjt.v4. i2.111

[76] Sangwan V S, Burman S, Tejwani S, Mahesh S P, Murthy R. Amniotic membrane transplantation: a review of current indications in the management of ophthalmic disorders. Indian J Ophthalmol. 2007 July-August; 55(4): 251-60. doi: 10.4103/0301-4738.33036. PMID: 17595472.

[77] Spaniol K, Holtmann C, Geerling G, Schrader S. Neue Ansätze zur Rekonstruktion der Augenoberfläche jenseits der Hornhaut [New approaches to ocular surface reconstruction beyond the cornea]. Ophthalmologe. 2017 April; 114(4):307-317. German. doi: 10.1007/s00347-016-0419-1. PMID: 28005177.

[78] Dua H S, Gomes J A, King A J, Maharajan VS. Review The amniotic membrane in ophthalmology. Surv Ophthalmol. 2004 January-February; 49(1):51-77.

[79] Gabler B, Lohmann C P. Hypopyon after repeated transplantation of human amniotic membrane onto the corneal surface. Ophthalmology. 2000; 107(7):1344-1346. doi: 10.1016/S0161-6420(00)00167-6

[80] Nubile M, Dua H S, Lanzini T E M et al. Amniotic membrane transplantation for the management of corneal epithelial defects: an-in vivo confocal microscopic study. Br. J. Ophthalmol. 92(1), 54-60 (2008).

[81] Clearfield E, Muthappan V, Wang X, Kuo I C, Johnston V. Conjunctival autograft for pterygium. Cochrane Database Syst Rev. 2016; 2: Cd011349. doi: 10.1002/14651858. CD004158. pub3

[82] Yazdanpanah, G.; Haq, Z.; Kang, K.; Jabbehdari, S.; Rosenblatt, M. L.; Djalilian, A. R. Strategies for reconstructing the limbal stem cell niche. Ocul. Surf. 2019, 17, 230-240.

[83] Dhandayuthapani B, Sakthikumar D. Biomedical Applications of Polymeric Materials and Composites. 1st ed. Weinheim, Germany: Wiley; 2017. pp. 1-20.

[84] Bracaglia L G, Smith B T, Watson E, Arumugasaamy N, Mikos A G, Fisher J P. Review 3D printing for the design and fabrication of polymer-based gradient scaffolds. Acta Biomater. 2017 Jul. 1; 56( ):3-13.

[85] Li H, Xue Y, Jia B, Bai Y, Zuo Y, Wang S, Zhao Y, Yang W, Tang H. The preparation of hyaluronic acid grafted pullulan polymers and their use in the formation of novel biocompatible wound healing film. Carbohydr Polym. 2018 May 15; 188( ):92-100.

[86] Chen, F. M., & Liu, X. (2016). Advancing biomaterials of human origin for tissue engineering. Progress in polymer science, 53, 86-168. https://doi.org/10.1016/j.progpolymsci.2015.02.004

[87] Williams D F. Challenges With the Development of Biomaterials for Sustainable Tissue Engineering. Front Bioeng Biotechnol. 2019; 7( ):127.

[88] Nikolova, M. P., & Chavali, M. S. (2019). Recent advances in biomaterials for 3D scaffolds: A review. Bioactive materials, 4, 271-292. https://doi.org/10.1016/j.bioactmat.2019.10.005

[89] Dolcimascolo A, Giovanna Calabrese G., Conocí S. and Parenti R. CHAPTER TITLE: INNOVATIVE BIOMATERIALS FOR TISSUE ENGINEERING. BOOK TITLE: Biomaterials in Regenerative Medicine. IntechOpen (2019). DOI: http://dx.doi.org/10.5772/intechopen.83839.5

[90] Caballe-Serrano J, Zhang S, Sculean A, Staehli A, Bosshardt D D. Tissue Integration and Degradation of a Porous Collagen-Based Scaffold Used for Soft Tissue Augmentation. Materials (Basel). 2020 May 25; 13(10): 2420. doi: 10.3390/ma13102420. PMID: 32466244; PMCID: PMC7287763.

[91] Muzzio, N., Moya, S., & Romero, G. (2021). Multifunctional Scaffolds and Synergistic Strategies in Tissue Engineering and Regenerative Medicine. Pharmaceutics, 13(6), 792. https://doi.org/10.3390/pharmaceutics13060792

[92] Kim M S, Lee M H, Kwon B J, Koo M A, Seon G M, Kim D, Hong S H, Park J C. Influence of Biomimetic Materials on Cell Migration. Adv Exp Med Biol. 2018; 1064:93-107. doi: 10.1007/978-981-13-0445-3_6. PMID: 30471028.

[93] Chen, F. M., & Liu, X. (2016). Advancing biomaterials of human origin for tissue engineering. Progress in polymer science, 53, 86-168. https://doi.org/10.1016/j.progpolymsci.2015.02.004

[94] Yu X, Tang X, Gohil S V, Laurencin C T. Biomaterials for bone regenerative engineering. Advanced Healthcare Materials. 2015; 4(9):1268-1285. DOI: 10.1002/adhm.201400760

[95] Cooper D. K. A brief history of cross-species organ transplantation. Proc Bayl Univ Med Cent., 25 (2012 January), pp. 49-57.

[96] Cooper D K C, Ye Y, Rolf L L, Zuhdi N. The pig as potential organ donor for man. In: Cooper D K C, Kemp E, Reemtsma K, White D J G, eds. Xenotransplantation, 1st edn. Heidelberg: Springer, 1991:481.

[97] Beckstead B L, Pan S, Bhrany A D, Bratt-Leal A M, Ratner B D, Giachelli C M. 2005. Esophageal epithelial cell interaction with synthetic and natural scaffolds for tissue engineering. Biomaterials 26(31): 6217-6228.

[98] Hara H, Cooper D K. Review Xenotransplantation—the future of corneal transplantation? Cornea. 2011 April; 30(4):371-8.

[99] Wang, X., Chung, L., Hooks, J., Maestas, D. R., Jr, Lebid, A., Andorko, J. I., Huleihel, L., Chin, A. F., Wolf, M., Remlinger, N. T., Stepp, M. A., Housseau, F., & Elisseeff, J. H. (2021). Type 2 immunity induced by bladder extracellular matrix enhances corneal wound healing. Science advances, 7(16), eabe2635. https://doi.org/10.1126/sciadv.abe2635

[100] Londono, R., & Badylak, S. F. (2015). Regenerative Medicine Strategies for Esophageal Repair. Tissue engineering. Part B, Reviews, 21(4), 393-410. https://doi.org/10.1089/ten.TEB.2015.0014

[101] Zhu Y, Zhou M. and Hou R. (Dec. 6, 2017). Tissue Engineering of Esophagus, Esophageal Abnormalities, Jianyuan Chai, IntechOpen, DOI: 10.5772/intechopen.69350. Available from: https://www.intechopen.com/chapters/55818

[102] Thankam F. G., Chandra I., Diaz C., Dilisio M. F., Fleegel J., Gross R. M., Agrawal D. K., Matrix regeneration proteins in the hypoxia-triggered exosomes of shoulder tenocytes and adipose-derived mesenchymal stem cells. Mol. Cell. Biochem. 465, 75-87(2020).

[103] Gilbert, T. W., Sellaro, T. L. & Badylak, S. F. 2006. Decellularization of tissues and organs. Biomaterials, 27(19): 3675-3683.

[104] Alvarado, C. et. Al. A retrospective-prospective comparative study (therapeutic) of 64 patients treated for an acute superficial and mid-partial thickness burns. Rev. Guatem Cir. Vol 7 No. 1, 2 y 3; enero-dic. 1998: 4-6.

[105] Argueta M P. Tratamiento de quemaduras de espesor parcial con nuevos apósitos biológicos. Tesis de graduación de Médico y Cirujano. Facultad de Ciencias Médicas, Guatemala, noviembre de 1998.

[106] Alvarado, C. et al. Consecutive case series of 401 patients with acute burns treated with epidermal-dermal matrix based on human skin analogues. Unpublished

The invention claimed is:

1. A method for precisely harmonizing structural and functional biological processes that lead to optimal reconstruction of Ocular Surface Disorders, said method COMPRISING:
   applying a biocompatible heterologous matrix (HM) of porcine esophagus, as a graft (substrate) or as a 'patch' (biological dressing), in direct contact with an ocular surface condition;
   wherein the biocompatible heterologous matrix (HM) of porcine esophagus is in the form of a sheet comprising a mucosa, a basement membrane, and a submucosa of the porcine esophagus.

2. The method of claim 1, said method COMPRISING the utilization of the biocompatible heterologous matrix (HM) of porcine esophagus in human or veterinary ophthalmology, to facilitate structural and functional restoration of lost or damaged ocular tissues.

3. The method of claim 2, said method COMPRISING restoration, remodeling, or repair of an ocular surface having the ocular surface condition by induction of connective and epithelial tissue repair-regeneration at said ocular surface.

4. The method of claim 3, wherein said ocular surface is a diseased or defective ocular surface.

* * * * *